(12) United States Patent
Aharoni et al.

(10) Patent No.: US 8,594,826 B2
(45) Date of Patent: Nov. 26, 2013

(54) METHOD AND SYSTEM FOR EVALUATING A MACHINE TOOL OPERATING CHARACTERISTICS

(75) Inventors: Ehud Aharoni, Kfar Saba (IL); Robert J. Baseman, Brewster, NY (US); Ramona Kei, Hopewell Junction, NY (US); Oded Margalit, Ramat Gan (IL); Kevin Mackey, Wappingers Falls, NY (US); Michal Rosen-Zvi, Jerusalem (IL); Raminderpal Singh, Essex Junction, VT (US); Noam Slonim, Jerusalem (IL); Hong Lin, Yorktown Heights, NY (US); Fateh A. Tipu, Wappingers Fall, NY (US); Adam D. Ticknor, Poughkeepsie, NY (US); Timothy M. McCormack, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/608,032

(22) Filed: Sep. 10, 2012

(65) Prior Publication Data
US 2013/0006406 A1 Jan. 3, 2013

Related U.S. Application Data

(62) Division of application No. 12/415,348, filed on Mar. 31, 2009, now Pat. No. 8,285,414.

(51) Int. Cl.
*G06F 19/00* (2011.01)
(52) U.S. Cl.
USPC .............................. 700/121; 438/16; 700/108

(58) Field of Classification Search
USPC ................ 700/121, 96, 108, 186, 30; 438/16; 707/601; 385/92
See application file for complete search history.

(56) References Cited

U.S. PATENT DOCUMENTS 5,442,562 A 8/1995 Hopkins et al.
5,949,678 A 9/1999 Wold et al.
(Continued)

FOREIGN PATENT DOCUMENTS

WO WO 2008/020182 A1 2/2008

OTHER PUBLICATIONS

Non-Final Office Action issued by the USPTO on Feb. 7, 2012 in parent application, U.S. Appl. No. 12/415,348.
(Continued)

*Primary Examiner* — Kidest Bahta
(74) *Attorney, Agent, or Firm* — Scully, Scott, Murphy & Presser, P.C.; Daniel P. Morris, Esq.

(57) ABSTRACT

A method, a system and a computer program product suitable for use in a manufacturing environment comprising a multiplicity of nominally identical independent tools. A computing device generates a multi dimensional array of process trace data derived from at least one of the independent tools, wherein, the array includes data representing a first dimension comprising a list of steps in a manufacturing recipe and data representing a second dimension comprising a list of a set of sensors generating measurements from at least one of the independent tools. The computing device conducts an analysis on at least one preselected subset of the multi dimensional array for the purpose of evaluating at least one operating characteristic of at least one of the independent tools. The computing device presents results of the analysis via a set of hierarchically linked and browseable graphics.

25 Claims, 21 Drawing Sheets

(56) References Cited

U.S. PATENT DOCUMENTS

| | | |
|---|---|---|
| 6,509,201 B1* | 1/2003 | Wright .............................. 438/16 |
| 6,629,012 B1* | 9/2003 | Riley et al. .................... 700/121 |
| 6,957,114 B1* | 10/2005 | Logsdon et al. ............. 700/100 |
| 7,123,980 B2 | 10/2006 | Funk et al. |
| 7,146,237 B2 | 12/2006 | Lev-Ami et al. |
| 7,213,980 B2* | 5/2007 | Oki et al. ......................... 385/92 |
| 7,216,116 B1 | 5/2007 | Nilsson et al. |
| 7,254,458 B2 | 8/2007 | Hasan |
| 7,356,580 B1 | 4/2008 | Huang et al. |
| 7,636,608 B2 | 12/2009 | Funk et al. |
| 7,672,747 B2 | 3/2010 | Huang et al. |
| 7,693,683 B2 | 4/2010 | Ihara |
| 7,831,326 B2 | 11/2010 | Lin et al. |
| 7,908,024 B2 | 3/2011 | Chen et al. |
| 8,010,483 B2* | 8/2011 | Huang et al. ................... 707/601 |
| 2002/0087229 A1* | 7/2002 | Pasadyn et al. ............... 700/121 |
| 2002/0116083 A1 | 8/2002 | Schulze |
| 2003/0208294 A1* | 11/2003 | Cheng et al. .................... 700/96 |
| 2006/0112073 A1 | 5/2006 | Jensen et al. |
| 2007/0250373 A1 | 10/2007 | Ernest et al. |

OTHER PUBLICATIONS

Notice of Allowance issued by the USPTO on May 30, 2012 in parent application, U.S. Appl. No. 12/415,348.

* cited by examiner

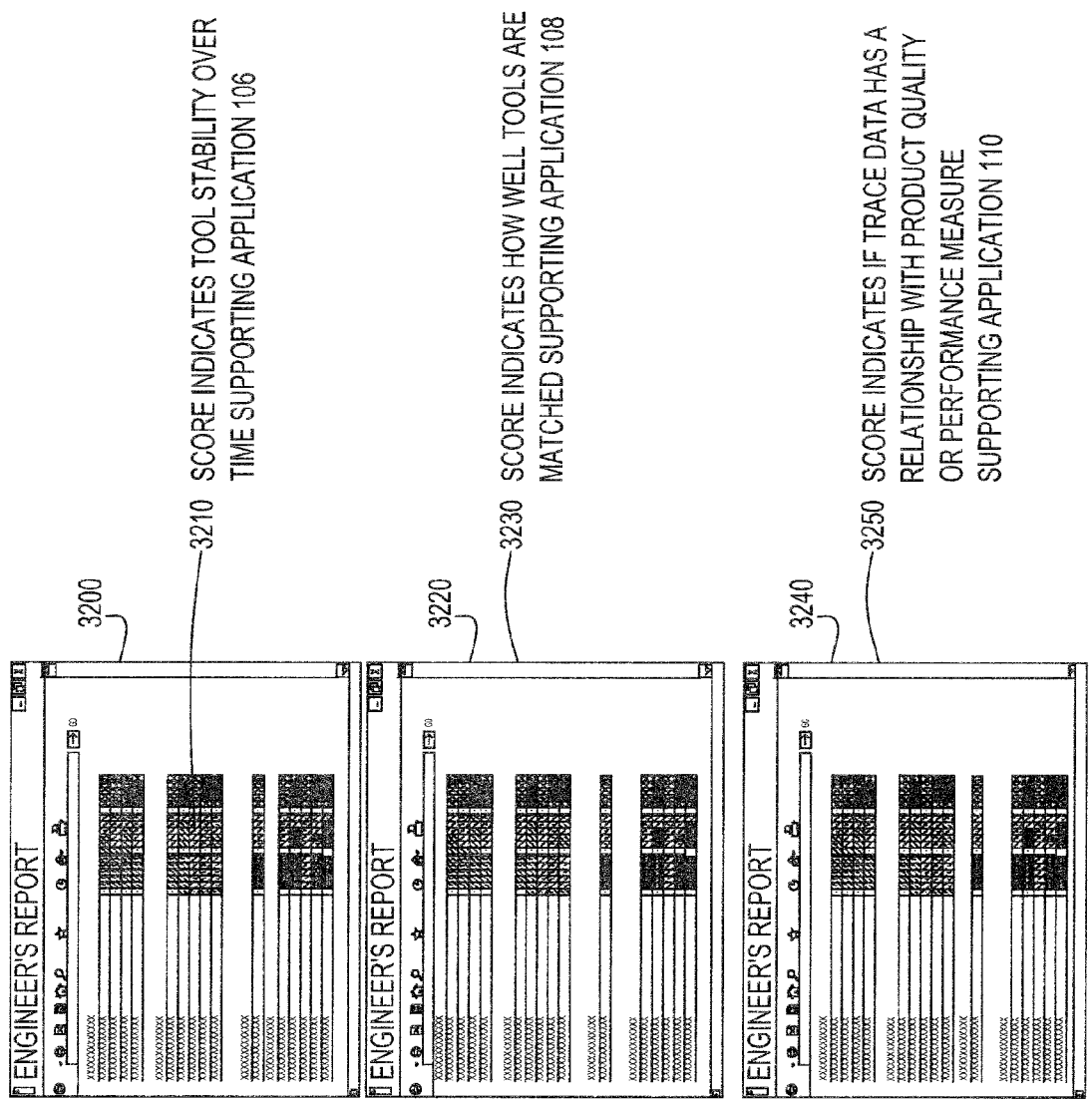

METHOD AND SYSTEM FOR EVALUATING A MACHINE TOOL OPERATING CHARACTERISTICS

CROSS REFERENCE TO RELATED APPLICATION

This application is a divisional of U.S. patent application Ser. No. 12/415,348, filed Mar. 31, 2009 the entire content and disclosure of which is incorporated herein by reference.

BACKGROUND

The present invention generally relates to a method and system for obtaining operating characteristics of a machine tool. More specifically, the present invention relates to generating an integrated display of multiple types of quantitative data for use in evaluating operating characteristics of a machine tool.

BACKGROUND OF INVENTION

Detecting and avoiding manufacturing defective products during a manufacturing process is an important goal. This is particularly true in connection with the process of manufacturing microelectronic devices such as semiconductors. During the manufacturing process, various measurements are made in order to detect and/or determine a defect such as when an observed value differs from a predetermined result.

When the difference is greater than a preset tolerance, an automated system may include an automatic feedback control to institute corrective measures to compensate for the error so as to continue to produce integrated circuit chips or wafers that have acceptable ranges or tolerances.

Conventional semiconductor processing facilities implement tools whose individual output in terms of quantity and/or quality can be controlled and set to a specific specification. However, each tool is just one part of the overall wafer production process. Furthermore, the output of a given tool typically results in at least some variation from wafer to wafer.

Thus, tools need to be shut down for maintenance frequently. Specifically, when a semiconductor product is processed by a tool, the resultant semiconductor product typically contains at least some variance (e.g., in terms of crystalline structure and/or physical specification) from what was optimally designed. This variance can occur due to any number of factors, such as, parts of the tool are wearing down and/or, the tool has not been fully recalibrated properly calibrated.

At some point, if the variance becomes too great the resultant semiconductor product will be unacceptable, and the tool causing the variance will need to be shut down for maintenance. Allowing a tool that is causing a variance to operate for a longer period of time without requiring maintenance (assuming the tool's operation is in accordance with its specification) would clearly be beneficial from a cost and yield perspective. An improved product quality would also be beneficial.

Consequently, in order to accurately control the quality and quantity of the wafers being produced by multiple wafer processing tools, it would be desirable to be able to evaluate the operating characteristics of a machine tool while the wafer is being processed/manufactured to avoid manufacturing a defective product. Therefore, what is needed is a method and system that can evaluate the operating characteristics of machine tools to insure that the final product output is defect free.

SUMMARY

There are provided a method, a system and a computer program product suitable for use in a manufacturing environment comprising a multiplicity of nominally identical independent tools. The method comprises the steps of: configuring a computing device including a processor and a memory to generate a multi dimensional array of process trace data derived from at least one of the independent tools, wherein, the array including data representing a first dimension comprising a list of steps in a manufacturing recipe and data representing a second dimension comprising a list of a set of sensors generating measurements from at least one of the independent tools; configuring the computing device including the processor and the memory to conduct an analysis on at least one preselected subset of the multi dimensional array for the purpose of evaluating at least one operating characteristic of at least one of the independent tools; and configuring the computing device including the processor and the memory to present results of the analysis via a set of hierarchically linked and browseable graphics.

The foregoing has outlined the preferred feature of the present invention so that those skilled in the art may better understand the detailed description of the invention that follows. Additional features of the invention will be described hereinafter that form the subject of the claim of the invention. Those skilled in the art should appreciate that they can readily use the conception and specific embodiment as a base for designing or modifying the structures for carrying out the same purposes of the present invention and that such other features do not depart from the spirit and scope of the invention is its broadest form.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

FIG. 11 is a view of an exemplary engineer's report under a tool stability solution according to one embodiment of the present invention.

FIG. 13 is a view of an exemplary chamber-recipe report under a tool stability solution according to one embodiment of the present invention.

FIG. 21 illustrates that each different engineer's report is independently used for each different application according to one embodiment of the present invention.

DETAILED DESCRIPTION

Figure 1:
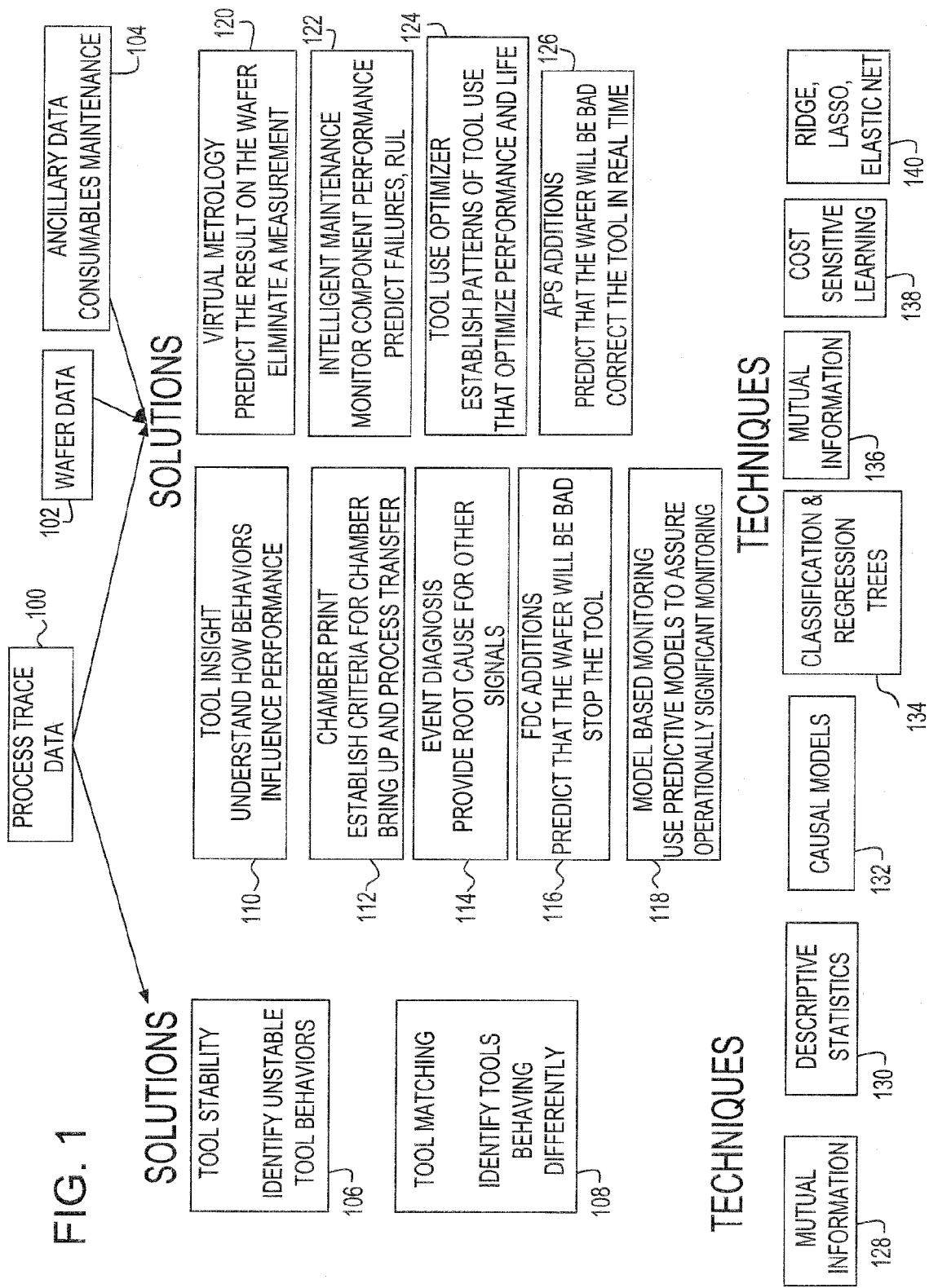
FIG. 1 illustrates an overview of the present invention according to one embodiment.

In the description that follows, numerous details are set forth in order to provide a through understanding of the present invention. It will be appreciated by those skilled in the art that variations of these specific details are possible while still achieving the results of the present invention.

In manufacturing semiconductor devices, photolithographic process steps (wafer prime, resist-apply, expose, bake, and develop) are performed in sequence hundreds of times on hundreds of wafers per day to produce well-defined photoresist patterns. In many cases, these "litho" process steps are combined into one tool, referred to as a photocluster, that links a resist-process track system with an exposure tool. Because lithography plays a critical role in creating device features throughout the semiconductor production operation, accurate, repeatable photocluster performance is vital, and the individual tools are typically monitored by means of numerous tool checks (inspection procedures designed to evaluate specific components of the process). Examples include resist-film-thickness and hot-plate temperature uniformity measurements on the track, and dose-uniformity and focus-control evaluations on the expose tool. Assessment of defect performance is limited to foreign material particulate inspections through subprocesses such as resist-apply, develop only, or dry-wafer handling. While the individual tool checks ensure that many of the most critical components of the litho process are within established specifications, they are unable to monitor the interactions between components, which can create out-of-spec conditions in the printed pattern even though individual subprocess components are operating as specified. Consequently, the integrated litho process is also monitored through inspections and measurements of production wafers. In-line product parametric data are sorted by photocluster and displayed in tool-specific statistical process control charts. When out-of-control trends are identified, operation of the problem tools is inhibited until the problem can be investigated and resolved.

As long as these inspections occur immediately after the litho process, and the products and levels processed on each tool are consistent from day to day, this approach to photo tool control works reasonably well. However, as the product loading becomes more varied, with multiple part numbers and multiple levels being processed on each photo tool, trend identification becomes more difficult and individual photo tool excursions are not always immediately evident. Furthermore, when defect inspection is 1 or 2 days downstream of the photo operation and 3 days worth of data are needed to recognize a trend, thousands of wafers can be affected by a tool problem before it becomes apparent.

Detection of a lithographic tool problem in the back end of the line may take even longer because prior-level "noise" can obscure defects during in-line inspection, and photo process excursions may not be evident until testing procedures are completed which may take several weeks. The time delays between when excursions occur and when they are actually detected are critical factors in maintaining wafer yields and device performance. Each day that a defect or dimensional problem remains undetected, hundreds of wafers can be affected. Though lithographic tools and lithographic process control are described herein, one embodiment of the present invention detects and reports abnormalities in all tools used for manufacturing a microelectronic device.

The various problems noted above are resolved by using process trace data in combination with heat maps. In the manufacture of semiconductors a "recipe" is known as a sequence of steps that one or more semiconductor products are directed to go through within a given tool and/or series of tools. According to one embodiment of the present invention, a recipe refers to recipe steps executed by a single tool. The data obtained from sensors during the steps of the recipe is known as "trace data" or "process trace data".

A recipe or a process comprises a plurality of recipe steps. A recipe step refers to a single step used to fabricate a microelectronic device (e.g., semiconductor wafer) such as a step for cooling a wafer at 100 degrees for minutes. A trace element refers to an item in the trace data. The process trace data obtained from a sensor is a set of measurements made over time by any one sensor enabled for a particular process, temperature, pressure, etc.

As referred to herein, a "heat map" is a special type of color based data visualization format that is well suited to enable analyzing large data volumes using an intuitive graphical display. Heat maps are good at representing large numbers of data points in ways that would be unwieldy and hard to interpret using traditional tables or charts. A heat map represents each item in the data set as an equally sized square, rectangle or other shape could be rectangles or presumably other shapes. In a heat map, the color of the square represents a quantitative value relative to the other boxes in the heat map, while the location can represent the sorting of another quantitative or categorical value. This allows a person looking at the chart to see all of the data items simultaneously.

More specifically, heat maps display data using different colors or shade gradations. Heat maps are helpful for spotting trends and making a quick determination of high, low and changes of value statistics. Heat maps can be applied to a single column (e.g., by illustrating a heat map associated with a single recipe step), or to all columns (e.g., by illustrating a heat map associated with a recipe). Heat maps can be applied to a single row (e.g., by illustrating a heat map associated with a single sensor), or to all rows (e.g., by illustrating a heat map associated with a tool group). In an example embodiment, bright green indicated on a heat map can represent cells of high value, and dark black can represent cells of low value, etc. However, it is understood that any color or visual scheme for representing values of cells may be implemented.

Trace data presented as heat map information can be used to quickly and accurately highlight a possible area of concern and be used as an aid in predicting status, diagnosing events, minimizing defects in products being manufactured, reducing maintenance downtime, etc. According to one embodiment, heat maps represent results of analyses on trace data. According to another embodiment, heat maps represent actual trace data.

In a preferred implementation, the system comprises linked hierarchical sets of graphical reports, including heat maps and figures, representing the results of multiple analyses of large scale and scope process trace data, aggregated over nominally identical processing resources, including, but not limited to, a chamber recipe report, a detailed report, an engineer's report and a manager's report.

Figure 2:
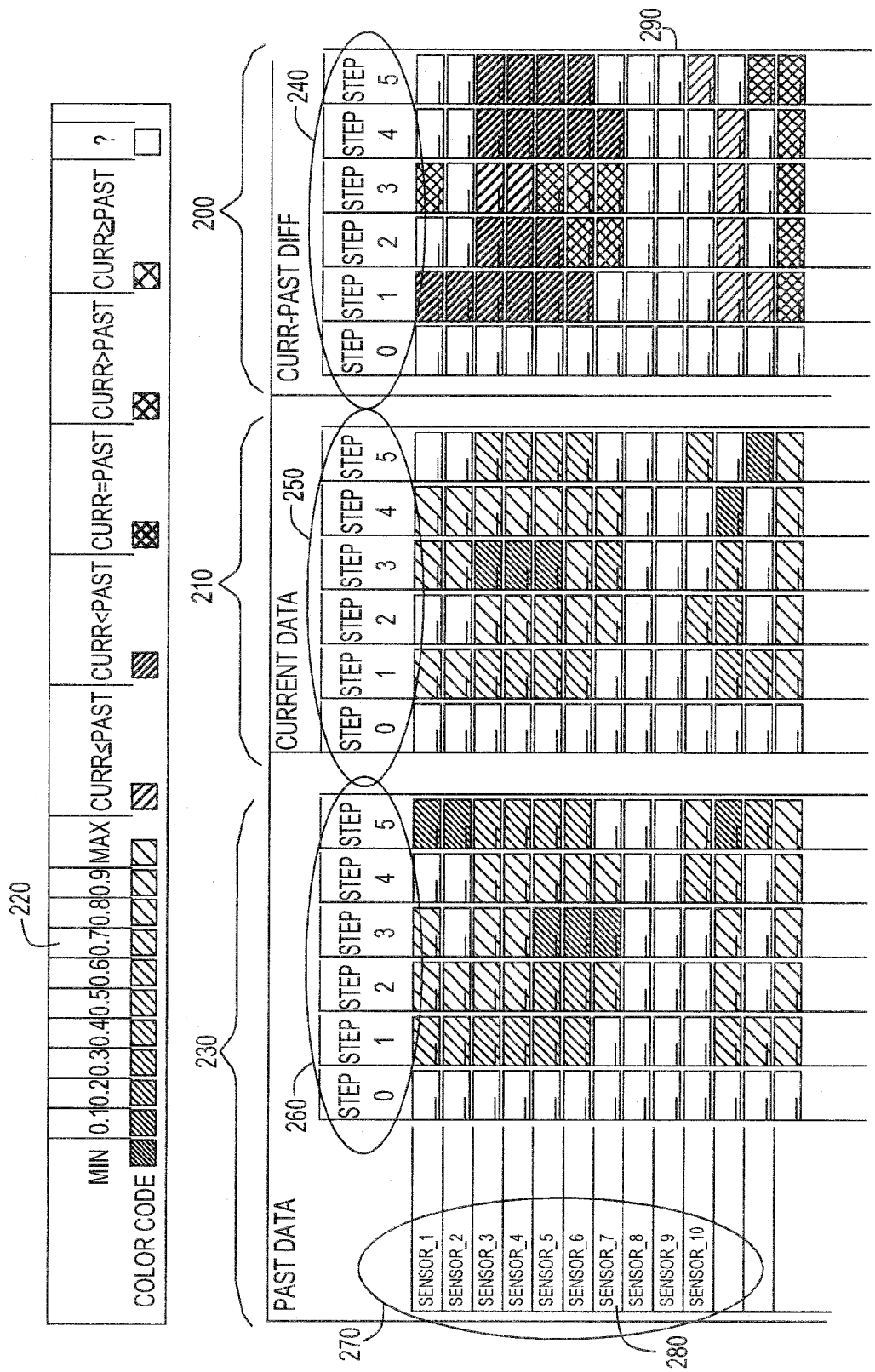
FIG. 2 is a view of an exemplary chamber-recipe report according to one embodiment of the invention.

According to one embodiment of the present invention, there is generated a chamber-recipe report, for example, illustrated in FIG. 2 per a manufacturing recipe for each nominally equivalent chamber. Each chamber-recipe report includes, but is not limited to, a set of three heat maps, one heat map reporting analyses of current data (i.e., present data from sensors on semiconductor manufacturing tools), one reporting analyses of data from a previous or reference period (i.e., past data from sensors on semiconductor manufacturing tools), and one reporting differences in analyses between the two time periods (i.e., between the current data and the past or reference data). Individual cells in each heat map may report the result of an individual analysis or a summary of multiple analyses for an individual recipe step and sensor. Each cell in the heat map is linked to a corresponding detailed report. The analysis performed on data from sensors includes, but is not limited to, mutual information over time, descriptive statistics, causal models, classification and regression trees, cost sensitive learning, ridge, lasso, elastic net, correlation coefficient and hypothesis tests including Student's "T test" (i.e., a test assessing whether the means of two groups are statistically different each other).

The mutual information refers to an information theory measuring a relationship between two different distributions. Descriptive statistics or hypothesis testing refers statistical characterizations or tests to detect differences in trace data distributions, including tests for differences in means. A causal model includes an Engle-Granger regression method, which is an approach selecting an arbitrary normalization and regressing a variable over others. Classification and regression trees include standard methods include a binary space partitioning methods, which recursively performs hierarchical partitioning or subdivision of an n-dimensional space into subspaces. Cost sensitive learning addresses prediction tasks for which penalties associated with prediction errors depend on a nature of the errors. Ridge, lasso and elastic network is a linear modeling technique that allows rapid evaluation and inclusion of large numbers (e.g., thousands or millions) of correlated variables.

A detailed report, e.g., invoked by clicking a cell or clicking a link associated with the cell in the chamber-recipe report, is generated to include, but is not limited to, two sets of detailed graphical reports: one reporting analyses of recent data (i.e., analyses of current data from sensors); and one reporting analyses of data from a past or reference period (i.e., analyses of past data from sensors). A detailed graphical report includes, but is not limited to: a first graph representing a trend over time of statistics characterizing time series collected during wafer processing from all nominally identical processing tools; a second graph representing a trend over time of statistics characterizing time series collected during wafer processing from a processing tool; a third graph representing average time series from single sensors during single recipe steps for individual wafers; and a fourth graph representing histograms of statistics characterizing time series from single sensors during single recipe steps for individual wafers. Examples of the detailed reports are shown in graphs 320-370 in FIG. 3.

An engineer's report presents to an engineer a single report covering all chambers performing a single recipe, e.g., by summarizing all chamber-recipe reports for a single recipe. The engineer's report includes only the rows from the chamber-recipe report that have interesting signals. An interesting signal refers to trace data from a recipe step or from a sensor that may indicate that a quality of the product may be compromised or indicate an operationally significant malfunction of a critical component of a manufacturing tool. Each engineer's report includes a set of three heat maps, one heat map reporting analyses of recent data, one heat map reporting analyses of data from a past or reference period, and one heat map reporting difference in analyses between the two time periods. An individual cell in each heat map report corresponds to an individual or a summary analysis of a corresponding chamber-recipe report. Thus, each cell in each heat map is linked to a corresponding chamber-recipe report. An engineer's report includes a list of top findings (i.e., most aberrant signals/data detected by sensors) selected from sets of individual chamber-recipe reports. The engineer's report may further include a list of individual cells in individual chamber-recipe reports that are ordered by the most statistically significant results (i.e., the most aberrant behavior detected by sensors or analyses). Therefore, the engineer's report typically provides a summary of results for a set of chambers performing only one recipe or multiple recipes designed to cover a scope of an engineer's responsibilities.

A manager may be responsible for a set of engineers and thus needs a higher level report essentially summarizing the status of each individual engineer's report. Each manager's report includes a set of three heat maps, one heat map reporting analyses of recent data, one heat map reporting analyses of data from a past or reference period, and one heat map reporting differences in analyses between the two time periods. Individual cells in each heat map report summary analyses for individual recipe groups and chamber groups. Each cell is linked to a corresponding engineer's report.

At least one of these reports may be used for systematic and early detection of aberrant processing events and/or manufacturing results (e.g., low yield, poor quality). One embodiment of the present invention performs detection of aberrant tool or machine behavior, e.g., by monitoring tool behavior to detect operationally significant events (i.e., operationally interesting events) not captured by other applications and detecting and monitoring relationships between tool behavior and tool performance (e.g. product quality measurements) to detect operationally interesting events (i.e., events that appears to have some material influence on a wafer quality or tool operation) not captured by other applications. One embodiment of the present invention supports standard engineering and management workflows for tool matching and tool variability reduction. One embodiment of the present invention facilitates root cause diagnostics of aberrant manufacturing events, e.g., through those reports such as the detailed report. One embodiment of the present invention facilitates diagnostics of out of service processing tools, e.g., through the detailed report. One embodiment of the present invention contributes to evolving online control strategies, e.g., via identifying critical tool components that should be monitored with real time monitoring and control applications. One embodiment of the present invention identifies chronic signals (i.e., signals that are detected repeatedly over time; e.g., every week a sensor detects that a temperature in a specific chamber is too high (which could reflect an attempted but failed remediation or a lack of activity to address the problem). One embodiment of the present invention improves an engineer's understanding of tool operations, e.g., through providing a tool insight application.

Those reports such as the chamber-recipe report provides efficient graphical representation of large scale and scope process trace data and analytics, e.g., through heat map representations, provides highly contextual data and analytics representations, e.g., through a chamber recipe report, in which an engineer sees the data from all sensors, for all steps, over different time periods, etc., provides comprehensive set of such representations with a single request (i.e., all of the different reports are created as a result of a single command to a generating system), e.g., via a graphical user interface in a combination with an engineer's report, provides analyses covering all steps and all time periods within steps, e.g., through a chamber-recipe report, summarizes results of multiple analyses, and provides detailed views of trace data and trace data relationships, e.g., through detailed reports.

One embodiment of the present invention supports a wide variety of engineering and management activities given multiple contexts, efficiencies of presentation, and actionable nature of output.

According to one embodiment, the present invention analyzes each sensor individually, provides linked heat maps (e.g., clicking a cell in a heat map invokes a lower-level report (i.e., detailed report)), aggregates multiple analyses (e.g., by averaging scores in a lower-level report or other means), and processes enormous amount of analysis rapidly (e.g., by employing parallel processing). A score refers to a level of interest indicating how data from a sensor during a recipe step sensor may affect a quality of a product or a health of a semiconductor manufacturing tool.

FIG. 1 illustrates an overview of the present invention according to one embodiment of the invention. A computing device (e.g., a computing device 1600 in FIG. 18) analyzes process trace data 100 (i.e., a set of measurements made over time by a sensor enabled for a particular process, temperature, pressure, etc.) by employing one or more statistical tests mutual information 128 between process trace data or summary statistics from process trace data and process date time or other measurements, T test for difference in means between the data from one tool and data from all other nominally identical tools, descriptive statistics 130, causal models 132, classification and regression trees 134, cost sensitive learning 138 and ridge, lasso, elastic net 140. Then, the computing device uses the analysis for providing applications/solutions such as "tool stability" 106, and "tool matching" 108. The tool stability solution identifies unstable tool behaviors, i.e., whether an operation of a tool is consistent hour by hour. The tool matching solution identifies tools behaving differently, i.e., identical tools need to operate in an identical fashion.

The computing device further analyzes wafer data (e.g., yield rate) 102 and ancillary data (e.g., a used life or a remaining useful life of tool components that need to be replaced periodically and that may or may not require maintenance) 104 with the process trace data 100. Upon the analysis, the computing device provides solutions/applications such as "tool insight" 110, "chamberprint" 112, "event diagnosis" 114, "FDC (Fault Detection Control) additions" 116, "Model Based Monitoring" 118, "Virtual metrology" 120, "Intelligence Maintenance" 122, "Tool use optimizer" 124, "APC (Advanced Process Control) additions" 126. The tool insight solution 110 presents how tool behaviors affect tool performances (including a measure of product quality). The ChamberPrint solution 112 establishes criteria for a recipe transfer from a facility to another facility, and also verifies that chambers are behaving and operating properly after maintenance or upgrade events in a chamber. The event Diagnosis solution 114 presents root causes for signals. The FDC additions solution 116 predicts whether a wafer will be defective and stops a tool when predicting the wafer is defected. Model Based Monitoring solution 118 performs monitoring and controlling of tools based on credible predictions of a quality of wafers being processed by tools. The virtual metrology solution 120 predicts a result on a wafer and eliminates a measurement. The intelligence maintenance solution 122 monitors a component performance in a tool and predicts a component failure. The Tool Use Optimizer solution 124 establishes patterns of a tool use that optimizes tool performance and life. The APC additions solution 126 predicts whether a wafer being processed will be defective and implements real time adjustments to tool operating parameters to avoid defects.

FIG. 2 illustrates a view of an exemplary chamber-recipe report generated by the computing device 1600, e.g., by executing the above-mentioned statistical tests, in according to one embodiment of the present invention. The chamber-recipe report 290 includes, but is not limited to, three heat maps. A first heat map 230 represents past or reference data obtained from sensors. A second heat map 210 represents current data obtained from sensors. A third heat map 200 represents difference between analyses of past data and current data. Rows 270 in the chamber-recipe report 290 correspond to sensors, e.g., an argon gas flow sensor 280, or other parameters (e.g., temperatures, pressures, etc.) measured from sensors. Columns 240, 250 and 260 correspond to recipe steps which are semiconductor manufacturing steps within a process or steps within a recipe to fabricate microelectronic devices. Cells are intersections of the rows 270 and the columns 240, 250 and 260.

Each row of a heat map corresponds to a sensor. Each column of a heat map corresponds to a recipe step. There may be at least one sensor per a tool or a wafer to obtain trace data of a recipe step while manufacturing at least one microelectronic device (e.g., a wafer or a semiconductor chip). Then, the computing device 1600 analyzes the obtained trace data to determine a level of operational significance found in the obtained trace data, e.g., by executing the above-mentioned statistical tests. For example, the computing device 1600 executes the statistical tests, and finds a maximum value of the statistical tests. As the maximum value of the statistical tests is lower, a corresponding trace data has higher operational interest. In other words, a low score value (e.g., 0.1) indicate an aberrant condition of a corresponding tool. The level of the operational interest refers to a degree of influence affecting a wafer quality or tool operation, e.g., how stable a tool is or how well matched a tool is. The computing device 1600 generates a score, e.g., results from a single statistical test or maximum, minimum, average or other combinations of the statistical tests, which indicates the level of the operational significance, and assigns the generated score to each cell. The computing device 1600 places the score in a corresponding cell of a heat map. Engineers or managers use scores in the cell to evaluate a semiconductor manufacturing tool performance. For example, higher scores represent healthier tool behaviors.

In a further embodiment, the computing device 1600 assigns a color or shade 220 to each score assigned to the trace data. The computing device 1600 may color a corresponding cell of a heat map with the assigned color. The engineer or managers may use the colored cells in the heat map to evaluate the tool performance or behavior. For example, a green color corresponding to the highest score may represent the healthiest condition of the tool. A black color corresponding to the lowest score may represent the unhealthiest condition of the tool.

Figure 3:
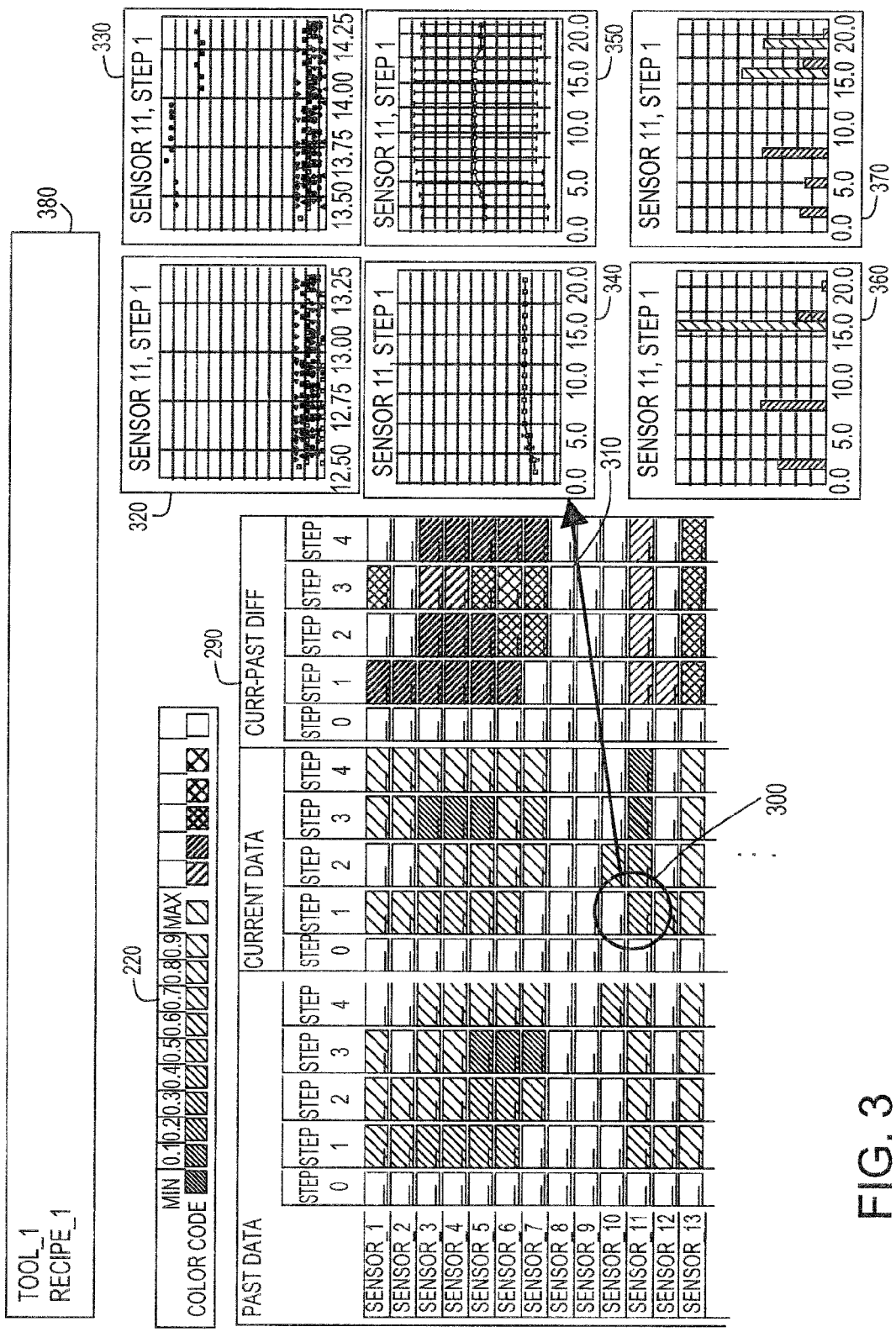
FIG. 3 illustrates an exemplary chamber-recipe report and an exemplary detailed report according to one embodiment of the invention.

Thus, engineers or managers can identify recipe steps, sensors, or time periods when tools are unstable and/or mismatched, e.g., through the reports such as a chamber-recipe report 290 shown in FIG. 2. The chamber-recipe report 290 describes trace data and their analyses in multiple contexts: 1. The behavior of a sensor across steps in a process; 2. The behavior of other sensors on the same tool; 3. The behavior of one tool or sensor as a member of a set of nominally identical tools or sensors; and 4. The behavior of processes, sensors, or tools in the context of current and reference time periods. The chamber-recipe report 290 includes links to detailed reports such as graphs 320-370 in FIG. 3, e.g., clicking a cell in the report 290 brings up at least four graphs representing the four different views of data (e.g., different view of analyses of process trace data). The scores may be understood by looking at graphs, but the exemplary graphs 320-370 illustrated in FIG. 3 are independent of the particular number or kind of statistical tests done on the data or summary statistics extracted there from. However, graphs (not shown) in the detailed reports can illustrate data or summary statistics from the statistical tests. The chamber-recipe report 290 may summarize multiple statistical test results from a single analysis, e.g., by assigning a single number (score) which is a maximum, minimum, average, other value of the multiple analyses to each cell as above. The chamber-recipe report 290 employs the above-mentioned statistical tests to analyze the trace data from sensors. The chamber-recipe report 290 provides analyses of trace data in isolation as well as predictors of tool performance. The chamber-recipe report 290, implemented as part of a Tool Stability application 106 or Tool Matching application 108, may report results of analyses of trace data in isolation. The chamber-recipe report 290, implemented as part of a Tool Insight application 110 may report analyses of trace data as predictors of performance on wafers. According to one embodiment, a tool behavior refers to a tool operation and trace data of the tool. Performance of a tool refers to test results on products (e.g., wafers) and measurements (e.g., yield rates) made on the products.

The chamber-recipe report 290 may provide analyses of all sensors, all steps, full duration of all steps or selections therefrom. The chamber-recipe report 290 compares behaviors of nominally identical chambers, e.g., by performing the above-mentioned statistical tests. The chamber-recipe report 290 assists an engineer to find what trace date to review, e.g., by providing a score to each trace data. The chamber-recipe report 290 may provide feedback to guide updates of FDC (Fault Detection Control) or SPC (Statistical Process Control) models.

According to one embodiment of the present invention, there is provided a system and method for aggregating, organizing, summarizing, and presenting process trace data for controlling at least one machine during a manufacturing process comprising aggregating process trace data that can be analyzed across nominally identical processing resources; organizing the process trace data analysis according to recipe step and trace element; summarizing results of process trace data analysis (e.g., results of the above-mentioned statistical tests) to a single numerical score or a set of numerical scores; and presenting the results via a set of hierarchically linked graphics.

Referring to the aggregating step:
In each "processing resource" or "tool" there are physical sensors such as temperature sensors, pressure sensors, that report data during discrete steps of a given production process, herein referred to as a "recipe". The execution is started by aggregating the data obtained for all sensors across all steps and all tools. This data is referred to as "trace data".

Referring to the organizing step:
For each tool the trace data in the heat maps are organized where the rows correspond to the physical sensors and the columns to the recipe steps. Thus, by considering a single heat map associated with a particular tool, a user can quickly compare the level of interest across all sensors for each step in the particular tool.

Referring to the summarizing the results step:
The data associated with a particular sensor and a particular recipe step are analyzed via above-mentioned multiple statistical tests. The results of the tests are summarized by a single number (e.g., a score) or multiple numbers, and features are created. The features, as described in detail below, are created from data associated with a particular sensor and particular steps. Such features are analyzed via the above-mentioned multiple statistical tests. The results of the tests are summarized by a single number (e.g., a score) or multiple numbers.

Referring to the presenting step:
One embodiment of the present invention allows a user to browse between different heat map reports that allow the user to see results from a single test or from summaries (e.g. minimum or maximum) of multiple tests. The score indicates a level of interest that should be found in the trace data. This score determines the color of the corresponding cell in the heat map. In this way the attention of a user is quickly drawn to data signals that are represented by the cell in the heat map that is believed to be of operational interest, which is also called operational significance. Different reports are linked in various ways. For example, the reports are stored in a memory of a computer and can be viewed on a display monitor. Thus, with a click, a user can navigate from a given heat map to view: 1) an alternative heat map for the same tool and recipe for a different set of underlying statistical test(s); 2) a detail report of the underlying data; and 3) a higher level report that summarizes the results for a set of tools. In addition, from a given detail report a user can navigate to: A) a report for the same physical sensor but a different recipe step; B) a report for the same physical sensor and the same recipe step but for a different tool; and C) a higher level heat map table report. The presenting step may include providing the heat map described in the summarization step to a user.

FIG. 3 illustrates a part of an exemplary detailed report including graphs 320-370 invoked, e.g., by clicking 310 a cell 300 in the chamber-recipe report 290. Upon selecting or clicking a cell in the chamber-recipe report 290, a computing device (e.g., a computing device 1600 in FIG. 18) including a CPU (e.g., a CPU 1611 in FIG. 18) and memory (e.g., a RAM 1614 in FIG. 18) executes code in the memory to generate graphs 320-370. The graph 320 shows data from a past or reference period. Actual trace data is not shown in the graph 320. Each point in the graph 320 represent data from a single sensor during a single recipe step, for a single wafer or a set of wafers processed simultaneously. Assume that a recipe step takes 20 seconds to complete. Actual process trace data for a given sensor during that recipe step for a single wafer (or set of wafers processed simultaneously) would be a series of measurements taken over time, for example, every second, gathered during an entirety of that 20 second. These measurements are called as a raw time series of measurements. According to one embodiment, the first step in an analysis of the measurements is an extraction of a "feature" or set of "features" from the raw time series. A feature may be a simple summary statistic such as the mean or median of the raw time series, or could be a result of a sophisticated analysis revealing time dependent features of the raw time series. A subsequent analysis which is performed to detect aberrant behaviours is actually performed on these "features" which are extracted from those raw time series. The graph 320 actually illustrates a plot of the features. For example, the graphs 320-330 are labelled as "median" at the top of those graphs 320-330 reflecting a fact that the feature being used for a current analysis is the median summary statistic.

The graphs 320-350 are also known as "Trend" charts, because each of those graphs 320-350 depicts a trend over time of statistics (features) characterizing time series collected while processing the microelectronic devices.

The graph 330 represents current trace data obtained from sensors in the present current data collection time period. In the graphs 320-330, each dot represents a wafer. In the graph 320, data are arranged between 0 and 40 and thus, there is no aberrant wafer. However, in the graph 330, six dots between 14.00 and 15.00 shown along X-axis values of the graph 330 are arranged between 130 and 140 along Y-axis values. Thus, these six dots represent a clear indication that the behavior of the tool has changed dramatically and suggests that corresponding six wafers may be potentially defective. A graphs 320 and 330 show data from all nominally equivalent tools. The graphs 340 and 350 show data from one of those tools. A detailed report including the graphs 320-370 can be accessed from a chamber-recipe or engineer's report. The chamber-recipe and engineer's report are created and viewed in a context of one specific "focus" chamber—that is, the particular chamber for which the detailed report is generated. According to one embodiment of the invention, the scales for all of the plots are generated automatically. When data from all chambers is plotted together, the scale is determined to allow a user to see all of the data from all chambers. In some cases that scale may make it difficult for the user to see the behaviour of the focus chamber in the trend chart. For instance, there may be a significant drift in a trend for the focus chamber from 10 to 20. If there is another chamber that has data ranging from 5 to 500, then it would be hard for the user to see the drift from 10 to 20 on a plot that is scaled to show data ranging up to 500. For this reason, the graphs 340 and 350 illustrates the trend for the "focus chamber" alone. A graph 360 represents histogram of wafers' aggregated time series behaviour in the past. A graph 370 represents histogram of wafers' aggregated time series behaviour in the present. The header information 380 is a part of the chamber-recipe report. The detailed report may also include its own header information such as header information 1000 in shown FIG. 12. The header information 380 may include, but is not limited to, a creation date of the chamber-recipe report 290, an average score of trace data in the report 290 and the number of wafers presented in the report 290.

Figure 4:
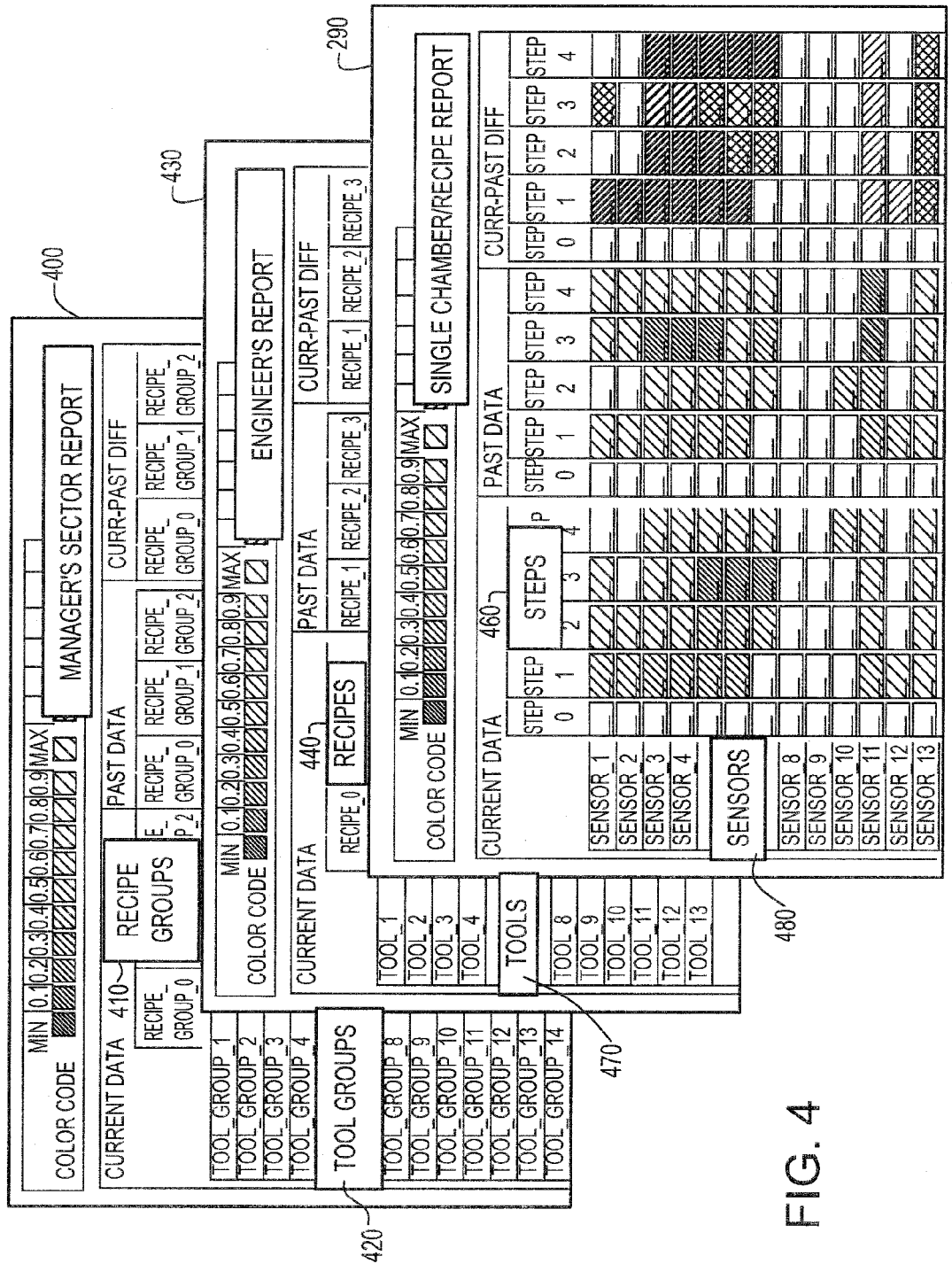
FIG. 4 is a hierarchical view of three reports according to one embodiment of the present invention.

FIG. 4 illustrates a hierarchical view of three reports, the chamber-recipe report 290, an engineer's report 430 and a manager's report 400. In this hierarchical view, the chamber-recipe report 290 is the lowest-level report. The chamber-recipe report 290 comprises recipe steps 460 at columns and sensor data or parameters 480 at rows. The engineer's report 430 is a middle-level report. A cell in the engineer's report 430 corresponds to a chamber-recipe report. Thus, clicking a cell in the engineer's report 430 brings up a corresponding chamber-recipe report. The engineer's report 430 includes recipes 440 at columns and machine tool devices, e.g., chambers 470, at rows. The manager's report 400 is the highest-level report. A cell in the manager's report corresponds to an engineer's report. Thus, clicking a cell in the manager's report brings up a corresponding engineer's report. The manager's report 400 includes recipe groups 410 at columns and chamber groups 420 at rows. In the manager's report, a group of recipes and a group of chambers belongs to an engineer responsible for the corresponding tool/process. The engineer's report 430 has a different design than an engineer's report illustrated in FIGS. 5-6. The engineer's report 430 has a same design with a chamber-recipe report 290. The engineer's reports in FIGS. 5-6 have a section per a tool, e.g., a chamber.

Figure 5:
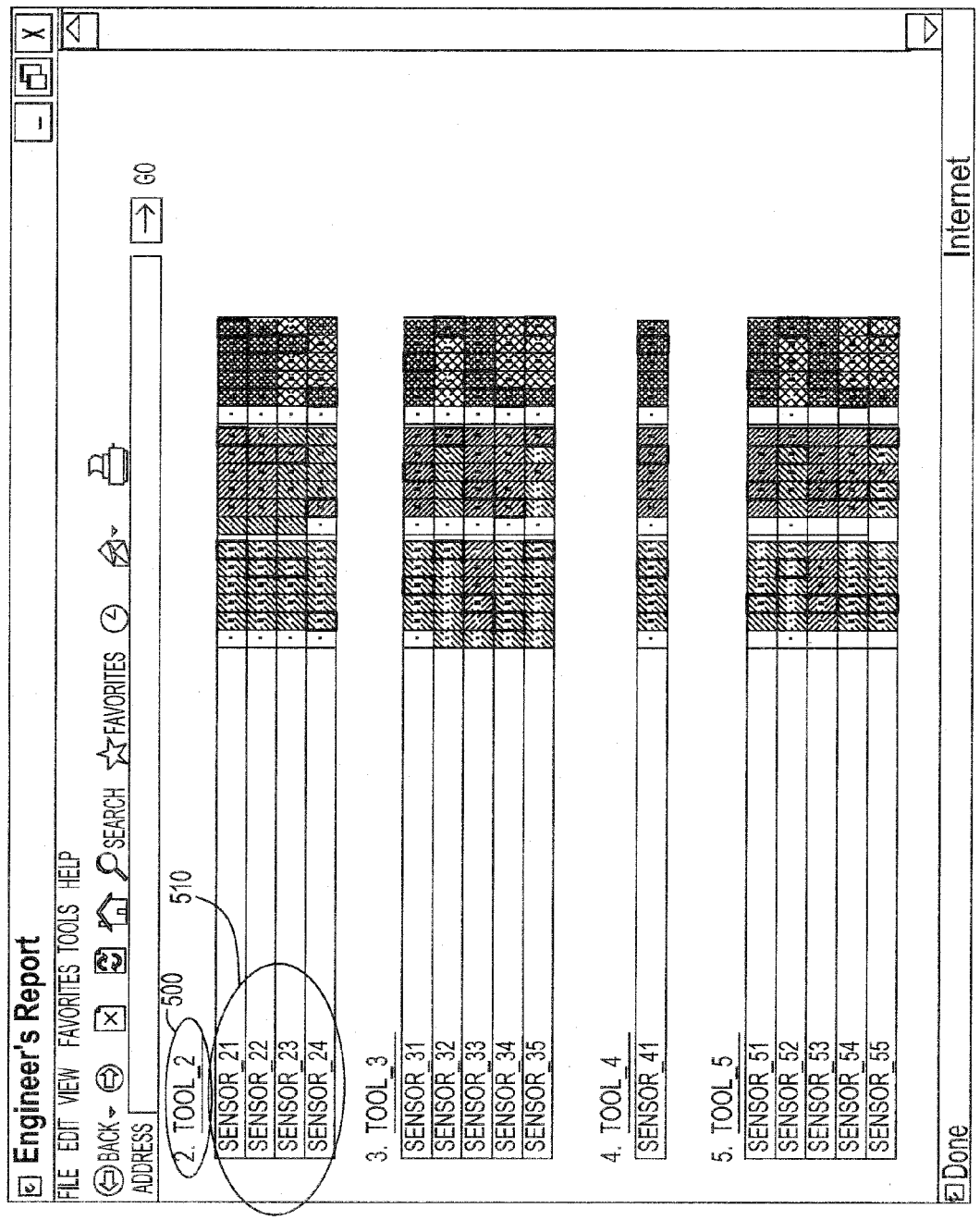
FIG. 5 is a view of an exemplary engineer's report according to one embodiment of the present invention.

FIG. 5 illustrates a detailed view of an exemplary engineer's report generated in accordance with the invention. The engineer's report is a summary of a small (e.g., 1) or large number (e.g., on the order of $10^6$) of heat maps. Each section 500, e.g., a section labelled "Tool_2" in the exemplary engineer's report in FIG. 5, represents a chamber in a semiconductor manufacturing tool. In the engineer's report, rows such as rows 510 per a section represent interesting rows (i.e., interesting sensors) in chamber-recipe reports. Thus, the engineer's report assists an engineer in knowing which chambers and recipes warrant attention. Many individual chamber recipe reports may be generated for one engineer. The engineer's report presents just a single report to the engineer, greatly reducing an effort required to comprehend the most interesting signals detected.

Figure 6:
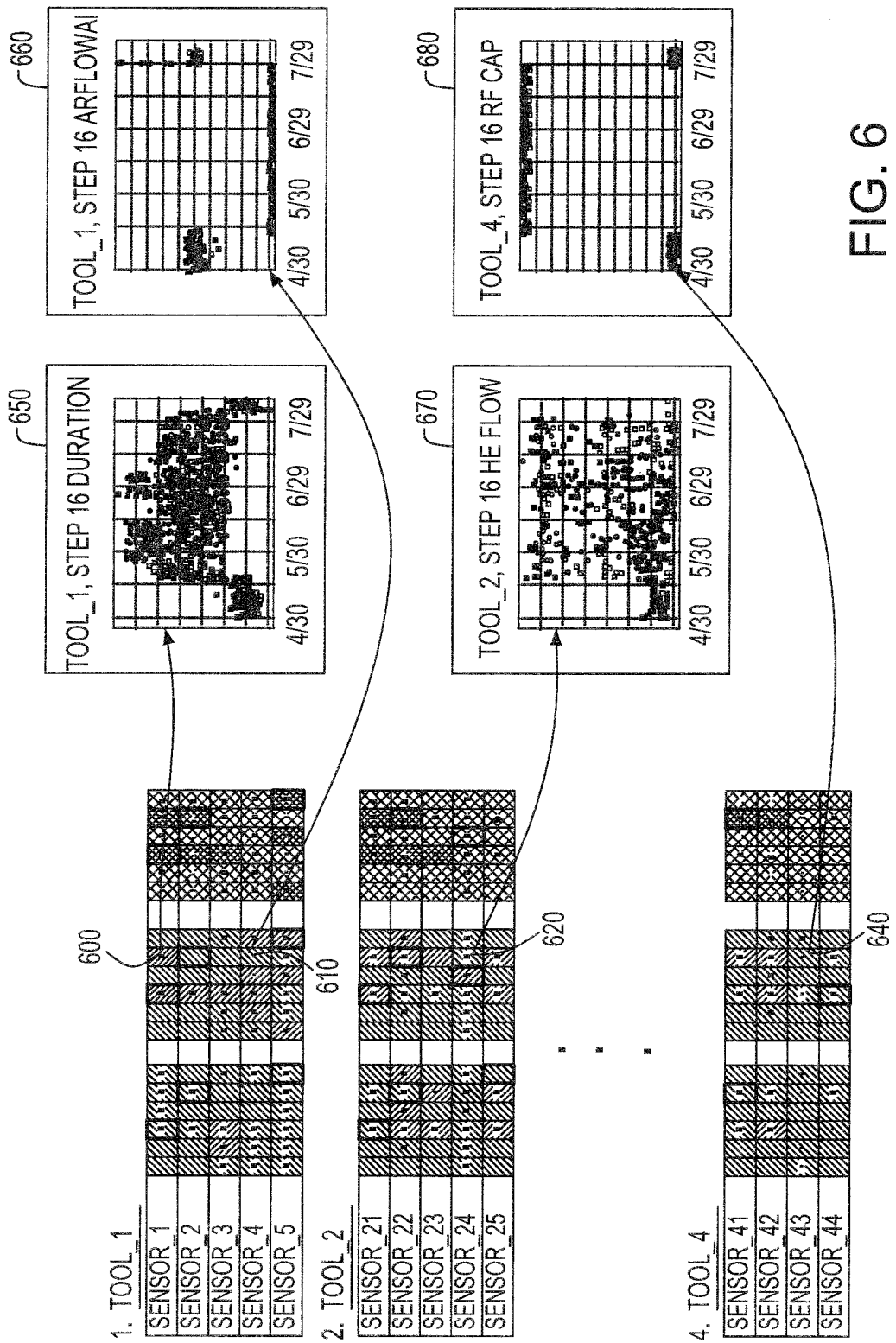
FIG. 6 illustrates portions of an exemplary engineer's report on the left and selected portions of several exemplary detailed reports on the right.

FIG. 6 illustrates a section of an exemplary engineer's report on the left and portions of four exemplary detailed reports on the right. For example, clicking a first cell 600 in the engineer's report invokes generating a detailed report which includes a graph 650. Clicking a second cell 610 in the engineer's report invokes generating a graph 660. Clicking a third cell 620 in the engineer's report invokes generating a graph 670. Clicking a fourth cell 640 in the engineer's report invokes generating a graph 680. These graphs 650-680 represent detailed reports associated with selected cells in an associated engineer's report, and represent results of the above-mentioned statistical tests.

Figure 7:
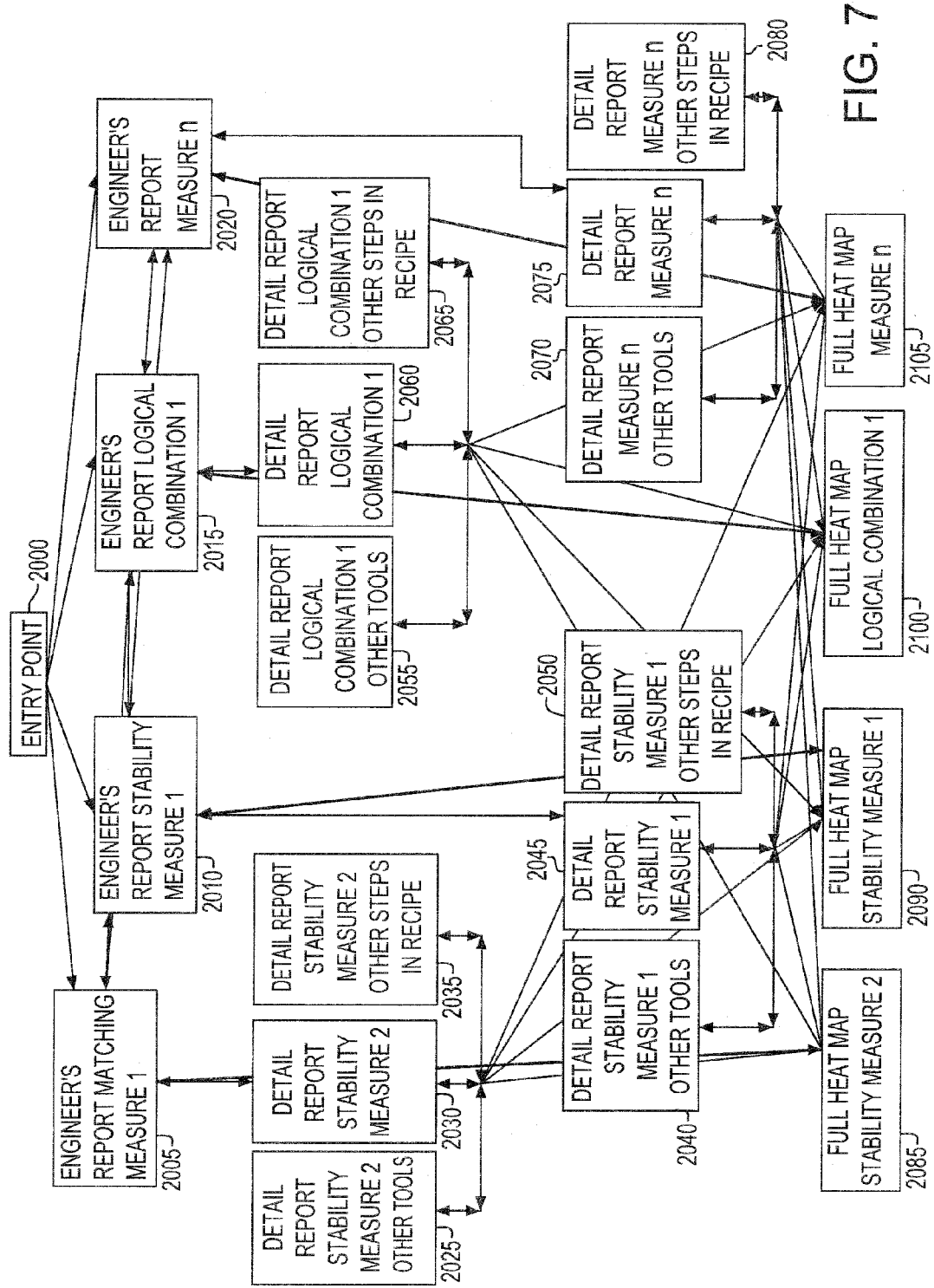
FIG. 7 illustrates a hierarchical view of reports according to one embodiment of the present invention.

FIG. 7 illustrates an exemplary hierarchical view of reports in a context of a particular application such as a Tool Stability application 106 according to one embodiment of the present invention. An entry point 2000 at the highest hierarchical position may be a web site that an engineer uses to access engineer's reports that are of interest to that engineer. From the entry point 2000, an engineer can access, e.g., via hypertext links, diverse engineer's reports representing different measures or analytical tests for an application. There may be "n" number of engineer's reports. Each engineer's report may reflect a different stability measure of a set of tools. A detailed report may reflect stability measure of a particular tool. Each engineer report depicted in FIG. 7 may have links to other engineer's reports.

The engineer's reports 2005, 2010, 2015 and 2020 are from one application such as a Tool Stability application 106. Alternatively, the reports 2005-2020 are from a single application such as a combination of a Tool Stability Solution 106 and a Tool Matching Solution 108. The application may use multiple statistical tests such as the Student's T test and mutual information. Each engineer's report reflects results of a statistical test on a set of tools. For example, as illustrated in FIG. 7, the engineer's report 2005 describes analyses or a summary of the analyses of a Stability measure 2 (2085) test result. The engineer's report 2010 describes analyses or a summary of the analyses of a Stability measure 1 (2090) test result. The engineer's report 2015 describes analyses or a summary of the analyses of a logical combination 1 (2100) result. The engineer's report 2020 describes analyses or a summary of the analyses of a Measure n test result. There may a similar set of reports for other applications such as a Tool Matching application 108. The stability measure 2 (2080), a stability measure 1 (2090) and a measure n (2105) refers to each different statistical test. The engineer's report 2005 may link to at least three detailed reports including: a detailed report 2025, a detailed report 2030 and a detailed report 2030. There may more or less detailed reports based on the number of the nominally identical tools. There may be a detailed report per a nominally identical tool.

Figure 12:
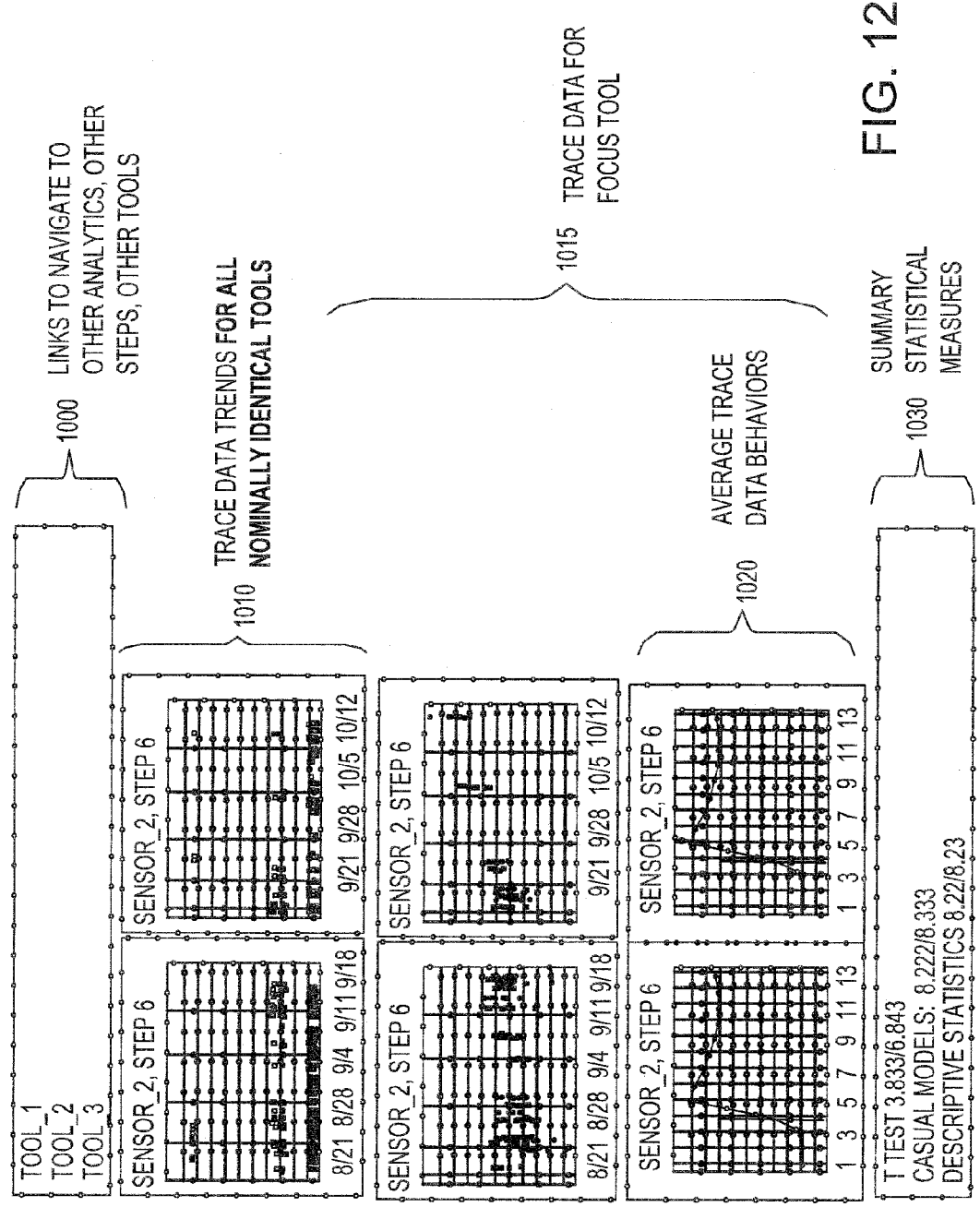
FIG. 12 is a view of an exemplary detailed report under a tool stability solution according to one embodiment of the present invention.

The detailed report 2030 includes graphs illustrating a first stability measure (e.g., results of a first statistical test such as the Student's T test; e.g., a stability measure 2) of a first particular recipe step based on process trace data obtained from a first sensor in a first particular tool (e.g., a first focus tool) and graphs illustrating of the first stability measure of the first particular recipe step based on process trace data obtained from the first sensors in all nominally identical tools with a first graphical representation. For example, as illustrated in FIG. 12, the detailed report 2030 corresponding to "Tool_1" may illustrate graphs 1010 depicting trace data trends of all nominally identical tools with the first graphical representation (e.g., a graphical representation highlighting the first particular tool, "Tool_1") and graphs 1015 representing trace data of the first particular tool. Footer 1030 in the report 2030 may describe summary of statistical measures of the first particular tool.

The detailed report 2025 includes graphs illustrating the first stability measure of the first particular recipe step based on process trace data obtained from the first sensor in a second particular tool that is different from the first particular tool and graphs illustrating the first stability measure of the first particular recipe step based on process trace data obtained from the first sensors in all nominally identical tools with a second graphical representation. For example, as illustrated in FIG. 12, the detailed report 2025 corresponding to "Tool_2" may illustrate graphs 1010 depicting trace data trends of all nominally identical tools with the second graphical representation (e.g., a graphical representation highlighting the second particular tool, "Tool_2") and graphs 1015 representing trace data of the second particular tool. Footer 1030 in the report 2025 may describe summary of statistical measures of the second particular tool. Thus, graphs 1010 in the report 2030 and graphs 1010 in the report 2025 may be identical except using different graphical representations (e.g., each report highlighting a different focus tool). Graphs 1015 in the report 2030 and graphs 1015 in the report 2025 may have different scores because the report 2030 and 2025 are based on each different focus tool. However, the report 2030 and report 2025 are based on a same recipe step and a same sensor.

A detailed report 2035 includes graphs illustrating the first stability measure of a second particular recipe step (i.e., a recipe step different from the first particular recipe step) based on process trace data obtained from the first sensor of all nominally identical tools and graphs illustrating the first stability measure of the second particular recipe step based on process trace data obtained from the first sensor of a particular tool. For example, header 1000 shown in FIG. 12 may include links to navigate other recipe steps. By clicking a different recipe step to navigate, graphs 1010 in the report 2035 may illustrates trace data trends for the different recipe step based on process trace data obtained from the same sensor in the nominally identical tools. Graphs 1015 in the report 2035 may illustrate trace data for the different recipe step based on process traced data obtained from the same sensor in the particular tool. There may a detailed report per a recipe step. Therefore, the report 2025 and the report 2035 may be based on a same sensor and a same particular tool. However, the report 2025 and report 2035 may illustrate a stability measure (i.e., results of a statistical test) for each different recipe step. Graphs 1010 in reports 2025-2035 may be the same, because the graphs 1010 represent trace data trend of all nominally identical tools. However, graphs 1015 in the reports 2025-2035 may be different, because each of the reports 2025-2035 is based on each different focus tool or recipe step.

Each engineer's report illustrated in FIG. 7 may be based on a same set of nominally identical tools. However, each engineer's report may be based on each different stability measure or based on process trace data obtained from each different set of sensors. Each full heat map (i.e., each chamber-recipe report) in FIG. 7 may be based on a same tool. However, each full heat may be based on each different stability measure.

As illustrated in FIG. 7, there may be at least four parallel and analogous set of reports. For example, a first set includes the engineer's report 2005, the detailed reports 2025, 2030 and 2035) and the chamber-recipe report 2085. A second set includes the engineer's report 2020, detailed reports 2070, 2075 and 2080 and a chamber-recipe report 2105. A third set includes the engineer's report 2010, detailed report 2040-2050 and a chamber-recipe report 2090. A fourth set includes the engineer's report 2015, detailed reports 2055-2065 and a chamber-recipe report 2100. The only difference between each of the four sets is an analytical statistical test used for each of the sets. For example, the first set may be created based on the first particular stability measure. The second set may be created based on a second particular stability measure which is different from the first stability measure. The detailed reports in the four sets may include same graphs, because there may be at least two graphs representing trace data trend of all nominally identical tools. However, scores represented in the detailed reports in the four sets may not necessarily same, since each set is based on each different statistical test, so the detailed reports in the four sets may include different scores reflecting each different statistical test in each set.

The detailed reports 2025-2080 may include, but is not limited to, links for generating the following heat maps: a heat map illustrating stability measurements 2 of all tools and all recipe steps 2085, a heat map illustrating tool stability measurements 1 of all tools and all recipe steps 2090, a heat map illustrating logical combination measurements of all tools and all recipe steps 2100 and a heat map illustrating stability measurements n of all tools and all recipe steps 2105. The stability measurements 1, 2 and n refer to results of one or more above-mentioned statistical tests. A logical combination refers to a logical operation (e.g., "AND" or "OR" operation) of results of multiple statistical tests.

Figure 8:
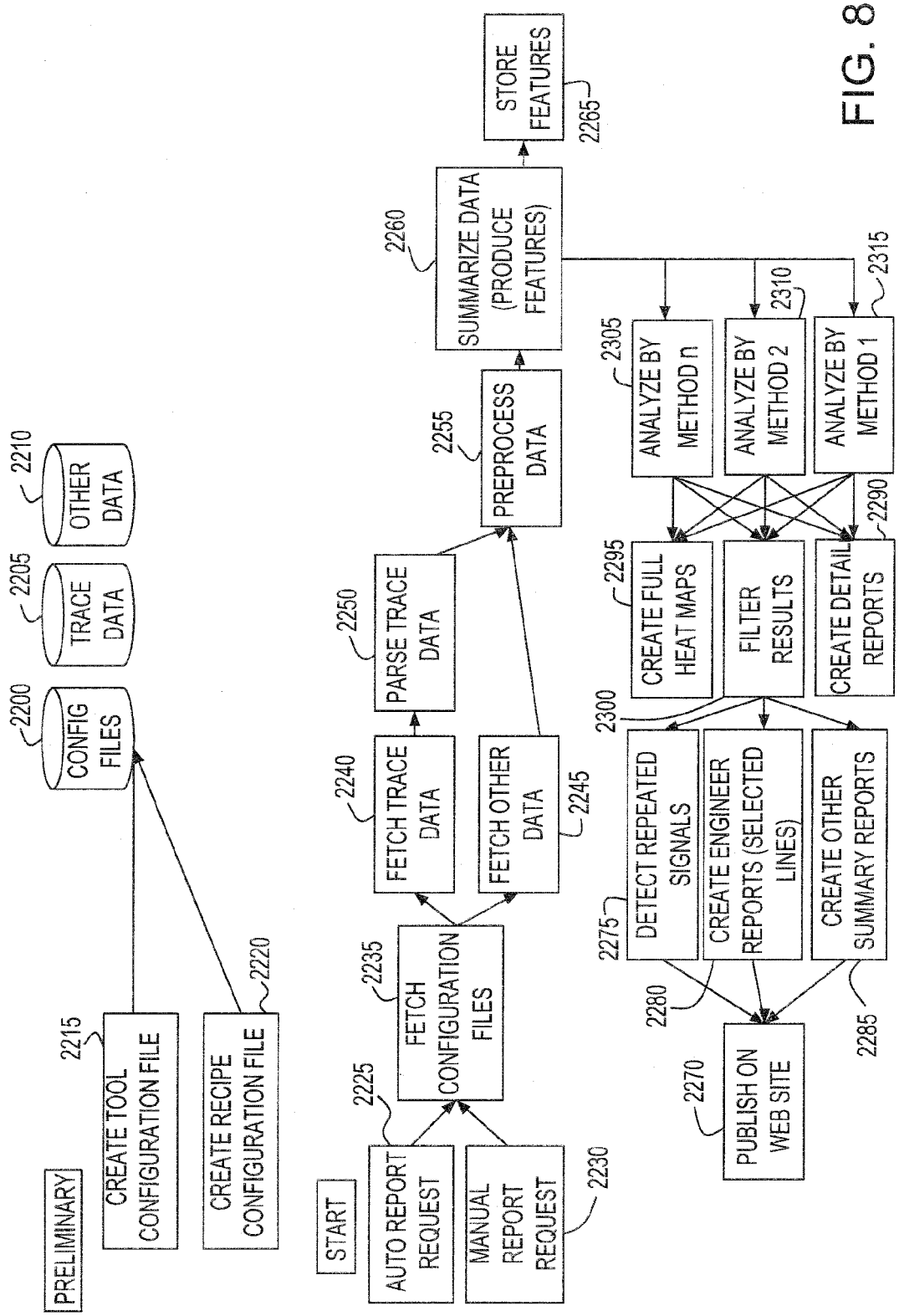
FIG. 8 illustrates a flow chart describing method steps for preparing or generating a report.

FIG. 8 illustrates a flow chart describing method steps of how an entire set of reports as generated for instance for a single application (e.g., a Tool Stability solution 106 or a solution combined of Tool Stability 106 and Tool Matching 108). According to one embodiment, at least two kinds of configuration files are required. For each chamber-recipe report, a configuration file 2215 describing the set of nominally identical tools is required, and another configuration file 2220 describing the recipe is required. Other kinds of configuration files or more or less configuration files may be required based on an implementation and application choice. The tool configuration file 2215 includes information about the tools, including what sensors are enabled on each of the tools to be analyzed. The recipe configuration file 2220 includes information about the recipe including the number and names of the individual recipe steps. These files 2215-2220 can be created by a manual, semi automated or perhaps fully automated procedure. The computing system 1600 may store these configuration files 2215-2220 in a physical storage device 2220. The physical storage device refers to a disk, an optical disc, a solid state drive, a memory, etc.

Generating a report (e.g., an engineer's report 430 in FIG. 4) starts by receiving an auto report request 2225 or a manual report request 2230. An auto report request 2225 may include a scheduled task, which is controlled by the computing device 1600, for generating the report. A manual report request 2230 may include a task, which is initiated by an engineer, for generating the report. Upon receiving the report request, at step 2235, the computing device 1600 fetches configuration files (e.g., tool configuration files and/or recipe configuration files) from the physical storage device 2200. The computing device 1600 may also retrieve trace data from a physical storage device 2205 storing the trace data at step 2240 and other data (e.g., which semiconductor manufacturing tools generated the trace data) from a physical storage device 2210 at step 2245. Alternatively, the computing device 1600 may retrieve trace data directly from the tools.

The computing device 1600 parses the retrieved trace data at step 2250. Parsing refers to separating the trace data in a file into segments amenable for statistical testing. The trace data may be accumulated in a single or multiple file(s) during processing of many microelectronic devices (e.g., $10^{12}$ devices). In order to perform the statistical tests, the trace data in the file(s) must be parsed into portions that reflect data for single wafers or groups of simultaneously processed wafers. The way implementing the paring may include, but is not limited to, programming in C, C++, Java®, .Net, etc. The implementation of the parsing may depend on how the trace data is originally collected and stored. At step 2255, the computing device 1600 pre-processes the parsed data and other data obtained at step 2245. In some cases, (process) trace data may include some values that are not appropriate to include in an actual analysis. Sensors may periodically fail, or for other reasons produce output that is not a genuine reflection of tool operation. Thus, the pre-processing data at step 2255 includes, but is not limited to, a detection of outlying unphysical data that should not be included in any analysis as it is not a genuine reflection of an operation of a tool. At step 2260, the computing device 1600 summarizes the pre-processed data to create features. As described above, the actual analyses of tool behaviour is performed preformed on features that are extracted from the underlying raw time series (after pre-processing). At steps 2305-2315, the computing device 1600 performs an actual testing on the features for evidence of aberrant behaviour, for example, three tests illustrated in FIG. 8. At step 2265, the computing device 1600 stores the features in a physical storage device.

The computing device 1600 incorporates a result of each statistical test separately when creating each heat map in a chamber-recipe report at step 2295. A cell in a heat map may indicate a result of a statistical test or a summarized (e.g., average) result of all the statistical tests performed.

At step 2300, the computing device 1600 creates an engineer's report, e.g., by performing filtering. The filtering refers to a process by which the engineer's report is generated from an entire set of test results, covering all cells in all chamber-recipe reports associated with an engineer. The engineer's report only includes results having an operationally interest for the engineer. At step 2290, the computing device 1600 creates a detailed report depicting a result of each statistical report and/or depicting a summarized result of all the statistical tests performed. At step 2275, the computing device 1600 detects chronic signals from the statistical test results remained after the filtering. The chronic signals refer to signals/data repeatedly detected by sensor(s) over a time period. At step 2280, the computing device 1600 creates an engineer's report, e.g., by summarizing the statistical test results remained after the filtering. At step 2285, the computing device 1600 creates other reports such as a manager's report e.g., by summarizing the statistical test results remained after the filtering. At step 2270, the computing device 1600 publishes the detected chronic signals, the created engineer's report and other reports to a database for accessing via a web site (not shown). The web site may have links to the detected chronic signals and the reports such as engineer's reports, detailed reports, chamber-recipe reports and manager's reports.

Figure 9:
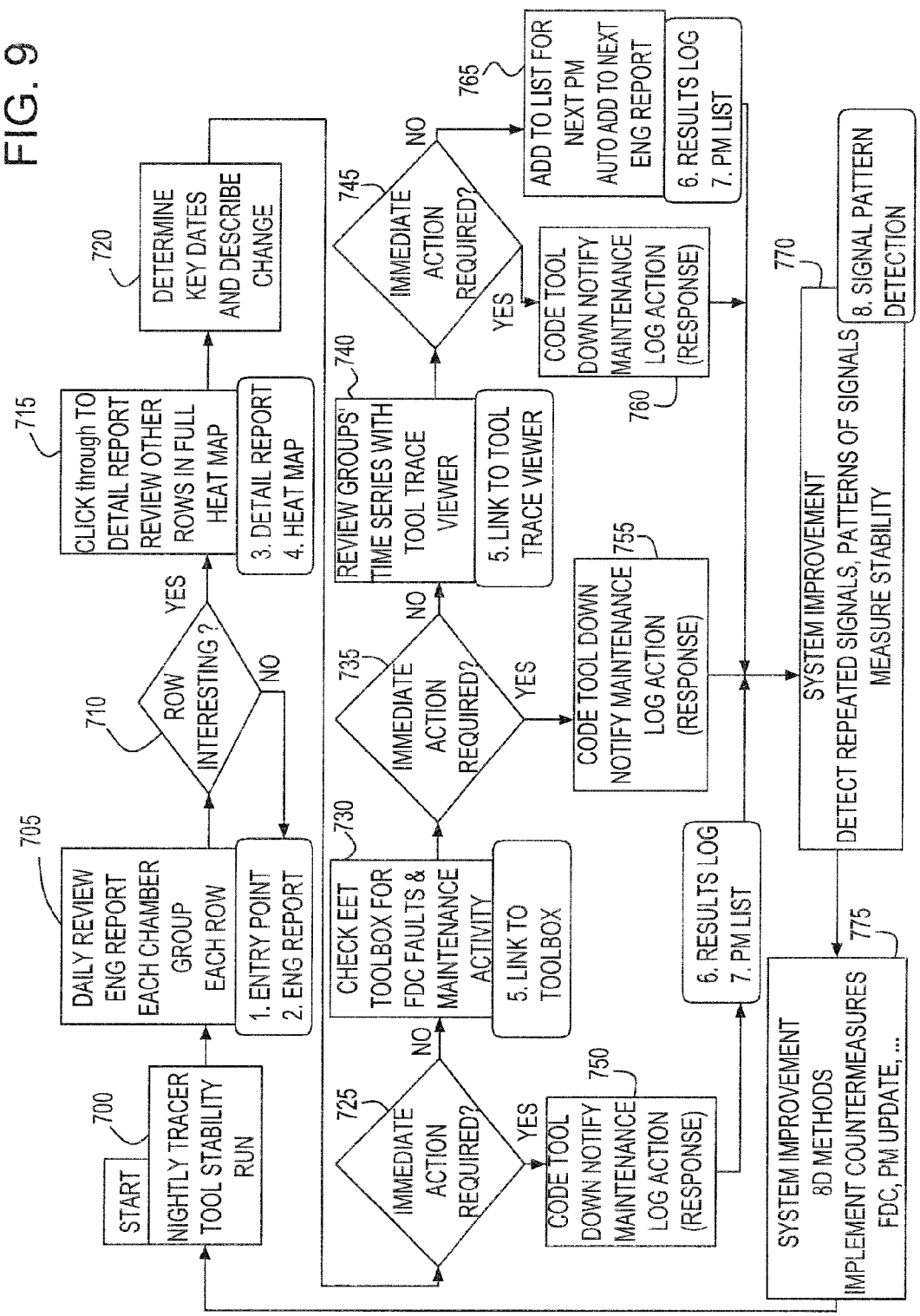
FIG. 9 is a flow chart of actions taken for a tool stability solution according to one embodiment of the present invention.

FIGS. 9-15 illustrate an exemplary embodiment of the present invention. FIG. 9 illustrates a flow chart of actions taken for a tool stability solution according to this exemplary embodiment. At step 700, the computing device 1600 analyzes trace data obtained from sensors during a predetermined time period. For example, the computing device 1600 perform the analysis at night, covering the trace data reflecting tool operation during other defined time periods, for example, over several weeks. At step 705, the computing device 1600 provides a user with navigation to the reports such as engineer's report as an entry point to start to evaluate tool stability. The engineer's report may provide subsets of heat maps with aberrant signals/data from sensors. At step 710, while reviewing the engineer's report, the user evaluates whether there is an interesting row (i.e., interesting sensor). If there is no interesting row, the control goes back to the step 705. Otherwise, at step 715, the user may click a cell(s) in the interesting row. Then, the clicking, in response, may invoke generating detailed report(s) and corresponding chamber-recipe report(s).

At step 720, the user finds out important dates of changes and evaluates the changes through the detailed reports and chamber-recipe reports. At step 725, the user evaluates whether an immediate action is required. If the immediate action is required, at step 750, the user stops a corresponding tool, notifies a maintenance team to fix the tool, stores a log history of the tool (e.g., create a document describing current and previous activities on the tool and then store the document), and the control proceeds to step 770. Otherwise, at step 730, the user reviews FDC faults and maintenance history of the tool. There may be provided a tool box for reviewing the faults and maintenance history of the tool. After reviewing the faults and maintenance history, at step 735, the user evaluates whether an immediate action is required. If the immediate action is required, at step 755, the user stops a corresponding tool, notifies a maintenance team to fix the tool, stores a log history of the tool, and the control proceeds to step 770. Otherwise, at step 740, the computing device 1600 provides other tool(s) that allow an engineer to review an underlying raw time series of related trace data. There may be provided a link to a tool trace viewer which provides the user with time series from a sensor at one or multiple recipe steps.

After reviewing the chamber group and recipe group, at step 745, the user evaluates whether an immediate action is required. If the immediate action is required, at step 760, the user stops a corresponding tool, notifies a maintenance team to fix the tool, and stores log history of the tool. Otherwise, at step 765, the user may initiate an action to add a maintenance task. The computing device 1600 may also initiate an action to assure that the next generated engineer's report will include refreshed data from the sensor and step, regardless of whether filters have nominally included that sensor and step in the engineer's report. This allows the engineer to see a verification that an originally detected aberrant condition is or is not still present. The computing device 1600 may store log or action history of the user and the maintenance schedule.

After executing the step 750, the computing device 1600 stores log or action history of the user and a maintenance schedule of the maintenance team. Then, the computing device 1600 executes a step 770. After executing the steps 755, 760 and 765, the computing device 1600 also executes the step 770. At step 770, the computing device 1600 detects chronic signals and pattern of other signals (a chronic signal would be a repeated signal. Other patterns could be detected—for instance sensor 1 could always be aberrant when sensor 2 is aberrant). Detecting such chronic signals has a benefit of highlighting for engineers a necessity of developing effective preventive measures. Detection of patterns of the signals may facilitate root-cause diagnosis by the engineers. The computing device 1600 notifies presences of chronic signals and patterns of aberrant signals, and measures tool stability using the above-mentioned statistic tests. At step 775, the maintenance team may further fix the tool associated with the chronic signals. The computing device 1600 may implement 8D method to fix tool. The 8D method includes, but is not limited to, D#1. Establish a team, D#2. Describe a problem, D#3. Develop an interim containment action, D#4. Define or verify root cause, D#5. Choose or verify root cause, D#6. Implement or validate permanent corrective action, D#7. Prevent recurrence, D#8. Recognize the team. The 8D method is a methodology of Six Sigma program developed by Motorola®, Inc. and famously used by General Electric® Company, and is described in detail at http://www.isixsigma.com/dictionary/8_D_Process-170.htm. At step 775, the computing device or engineers 1600 may also implement counter measures (meaning actions to eliminate the fault) and updates FDC system, and the maintenance schedule. After executing the step 775, the control goes back to step 700.

Figure 10:
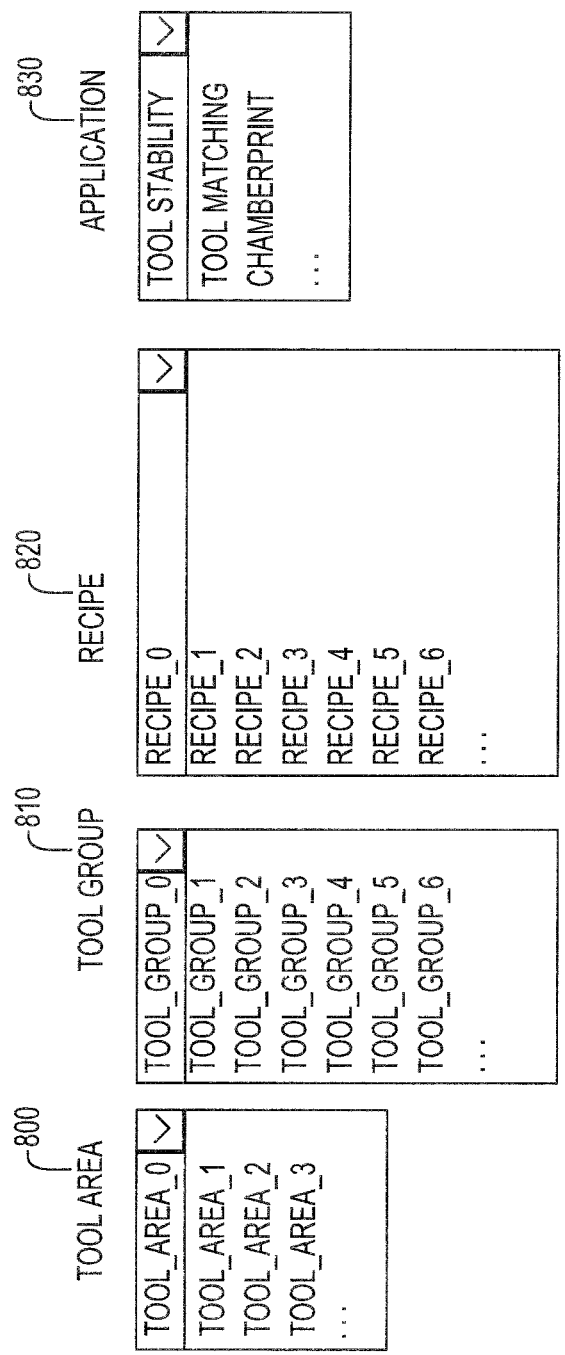
FIG. 10 is a view of a graphical user interface of a tool stability solution according to one embodiment of the present invention.

FIG. 10 illustrates an exemplary graphical user interface (GUI) presented to a user at step 700 in FIG. 9 according to an exemplary embodiment of the present invention. Through the GUI, the user selects an area 800 to evaluate tool stability. The area 800 may include, but is not limited to, RIE (Reactive Ion Etch), CMP (Chemical Mechanical Process), RTP (Rapid Thermal Process), INS (Insulation), etc. Then user may select a chamber group 810 to evaluate the tool stability. The user may also select a recipe 820 to evaluate the tool stability. At the end, the user may select the tool stability as an application 830. For example, all of the analyses may run every night. Thus, when an engineer accesses the user interface, the engineer is selecting reports to review, not requesting that analyses be conducted. The regular nightly analyses may cover two consecutive periods of 2 weeks of data. In some cases, an engineer may wish to see analyses covering different data collection periods. The Entry Point (i.e., the user interface) as shown in FIG. 10 does not show a provision for making such ad hoc requests (i.e., requests for analyses covering a particular data collection period), but the Entry Point could be support such requests. Then, for example, the computing device 1600 is configured to operate during a predetermined time period, e.g., at a night time, to generate a chamber-recipe report, detailed reports, an engineer's report and a manager's report corresponding to a selected chamber group and recipe, e.g., by performing the above-mentioned statistical tests.

Figure 11:
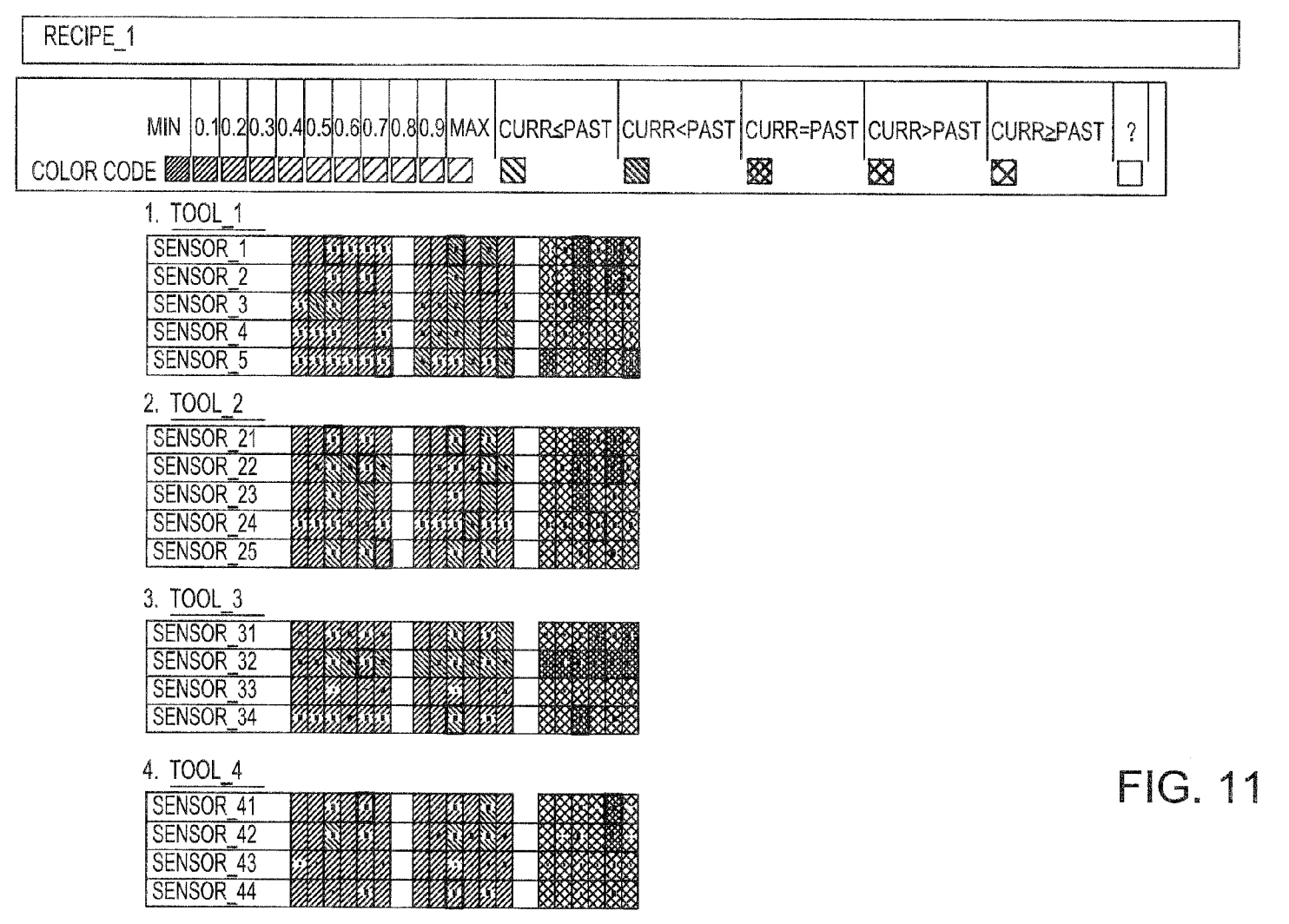

FIG. 11 illustrates an exemplary engineer's report presented at the step 705 in FIG. 9. The engineer's report assists an engineer in knowing which chambers and recipes potentially warrant the engineer's attention. Each block illustrates sensors with interesting signals for a corresponding chamber. Each cell in the engineer's report is color-coded or accordance with operational significance of a corresponding signal. Each cell is also linked to corresponding detailed report(s).

FIG. 12 illustrates exemplary detailed report(s) shown at the step 715 of FIG. 10. A header 1000 in the detailed report(s) provides links to navigate other analyses, other recipe steps or other chambers. Graphs 1010 illustrate trace data trends, e.g., by illustrating a graph corresponding to past data and a graph corresponding to current data, of all nominally identical tools. Bottom four graphs 1015 illustrate trace data trends of a particular tool (e.g., a focus tool). Bottom two graphs 1020 illustrate average trace data behaviours. A footer 1030 of the detailed report(s) describes a summary of results of the above-mentioned statistical tests.

Figure 13:
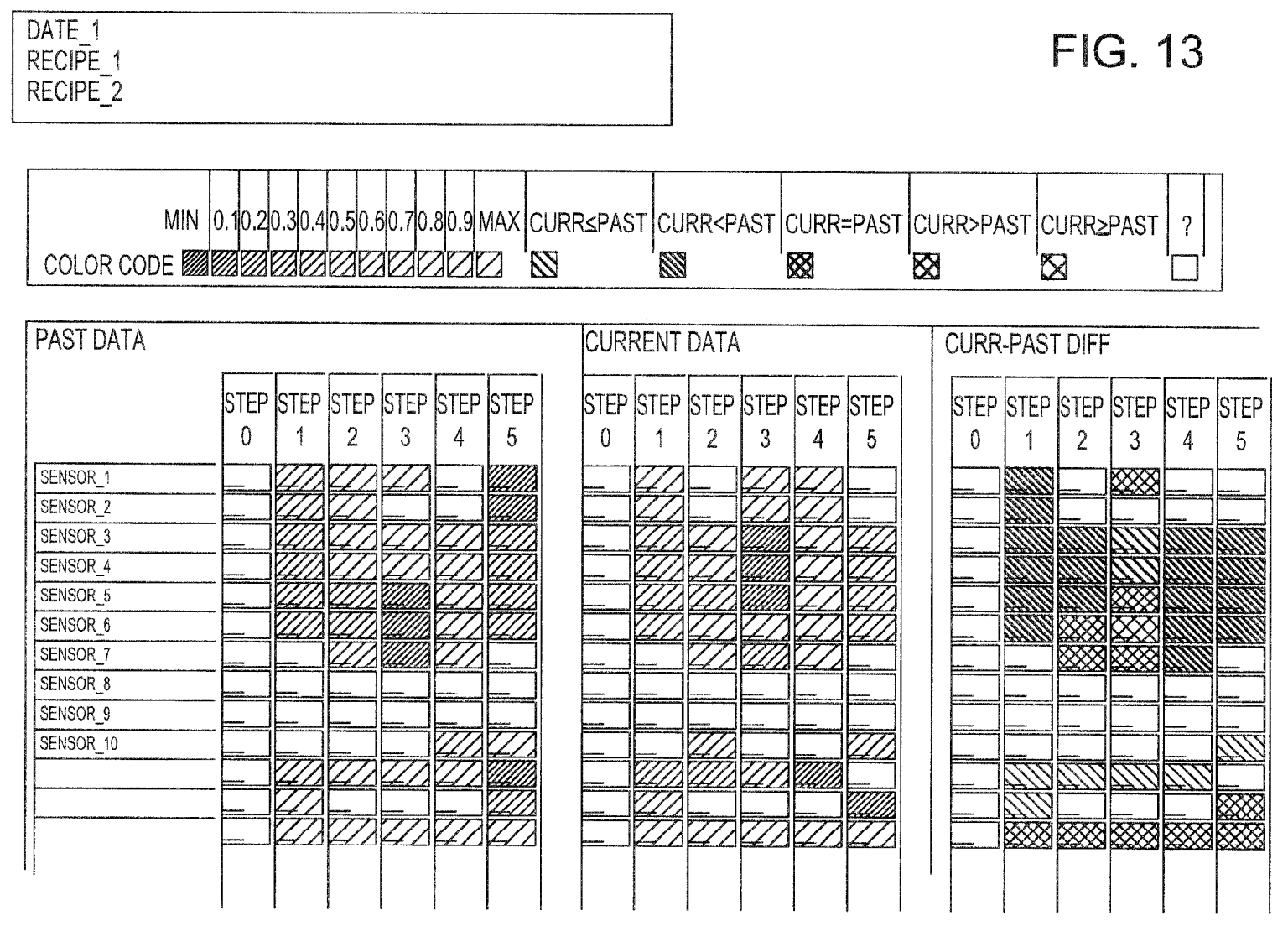

FIG. 13 illustrates an exemplary chamber-recipe report presented at the step 715 of FIG. 9. The chamber-recipe report describes data from all sensors included in all chambers. Each cell in the chamber-recipe report is color-coded in accordance with operational significance of a corresponding signal. Each cell is also linked to detailed report(s).

Figure 14:
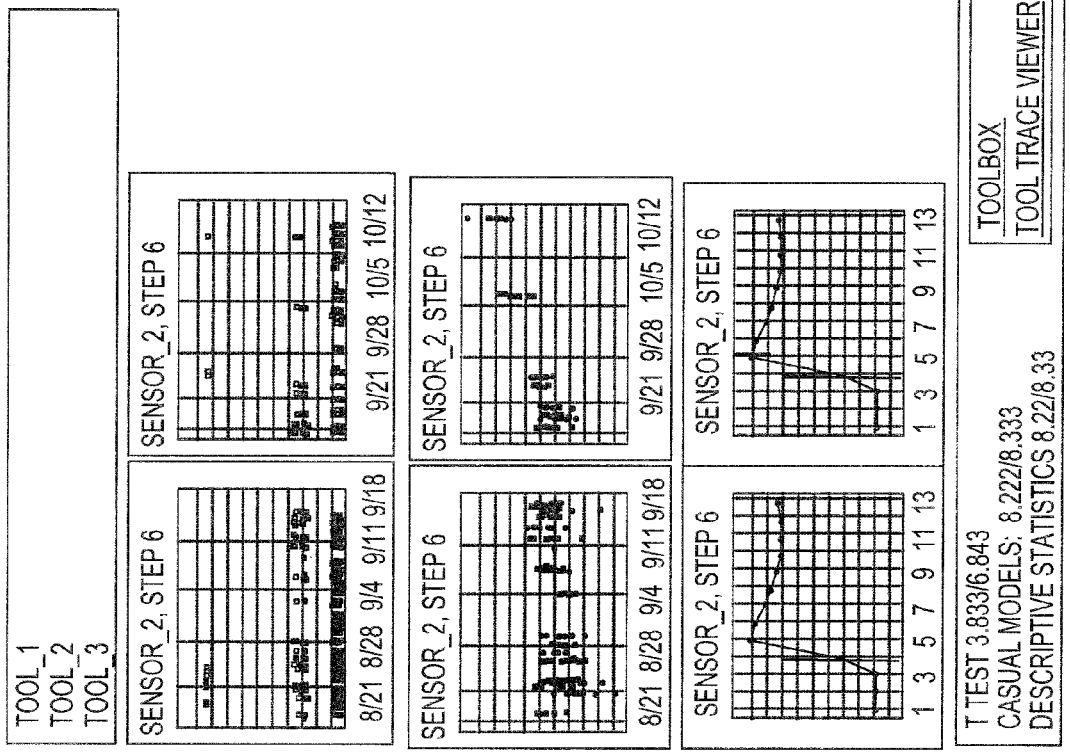
FIG. 14 is a view of an exemplary detailed report under a tool stability solution according to one embodiment of the present invention.

FIG. 14 illustrates an exemplary detailed report provided, e.g., by clicking 310 a cell 300 in the chamber-recipe report 290 shown in FIG. 3. The detailed report is almost same to the detailed report illustrated in FIG. 12 except that the detailed report in FIG. 14 includes two links 1200. One link is to invoke the tool box described at the step 730 in FIG. 9. Another link is to invoke the tool trace viewer described at the step 740 in FIG. 9.

Figure 15:
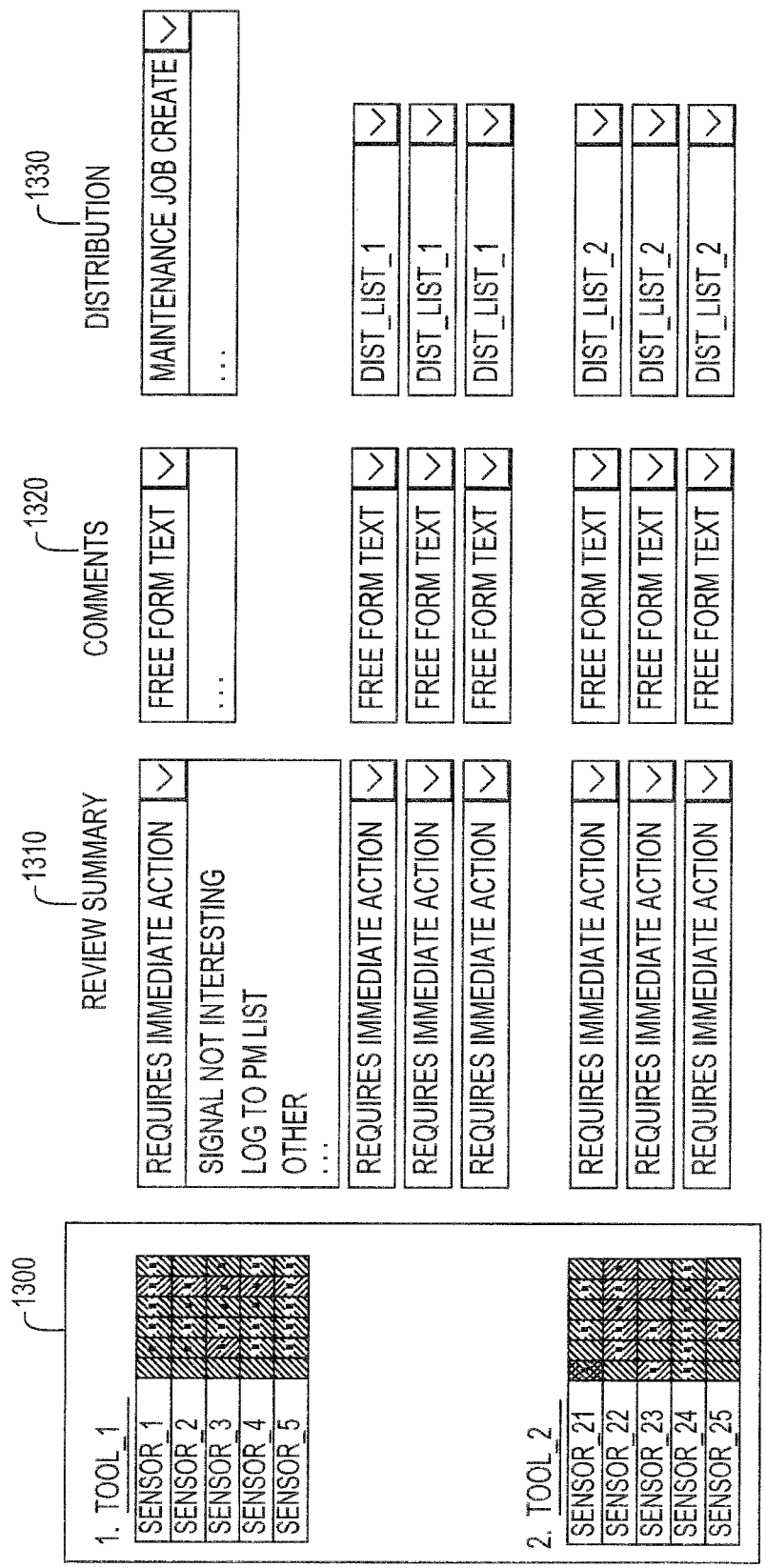
FIG. 15 is a view of an exemplary graphical user interface in a combination with an exemplary engineer's report according to one embodiment of the present invention.

FIG. 15 illustrates a graphical user interface (GUI) presented at steps 725, 735 and 745 in FIG. 9. The GUI may include an engineer's report 1300, a review summary 1310, a comment 1320 and a distribution 1330. A user may select "require an immediate action", "Logging", or "Other" from drop-down menus under the review summary 1310. The user may able to add a comment, e.g., by selecting a "free form text" menu under the "comments" drop-down menu 1320. The user may select an email address to distribute the engineer's report 1300 or some components thereof under drop-down menus under the distribution 1330. The user may also use the distribution 1330 to initiate some maintenance or remedial activity.

Figure 16:
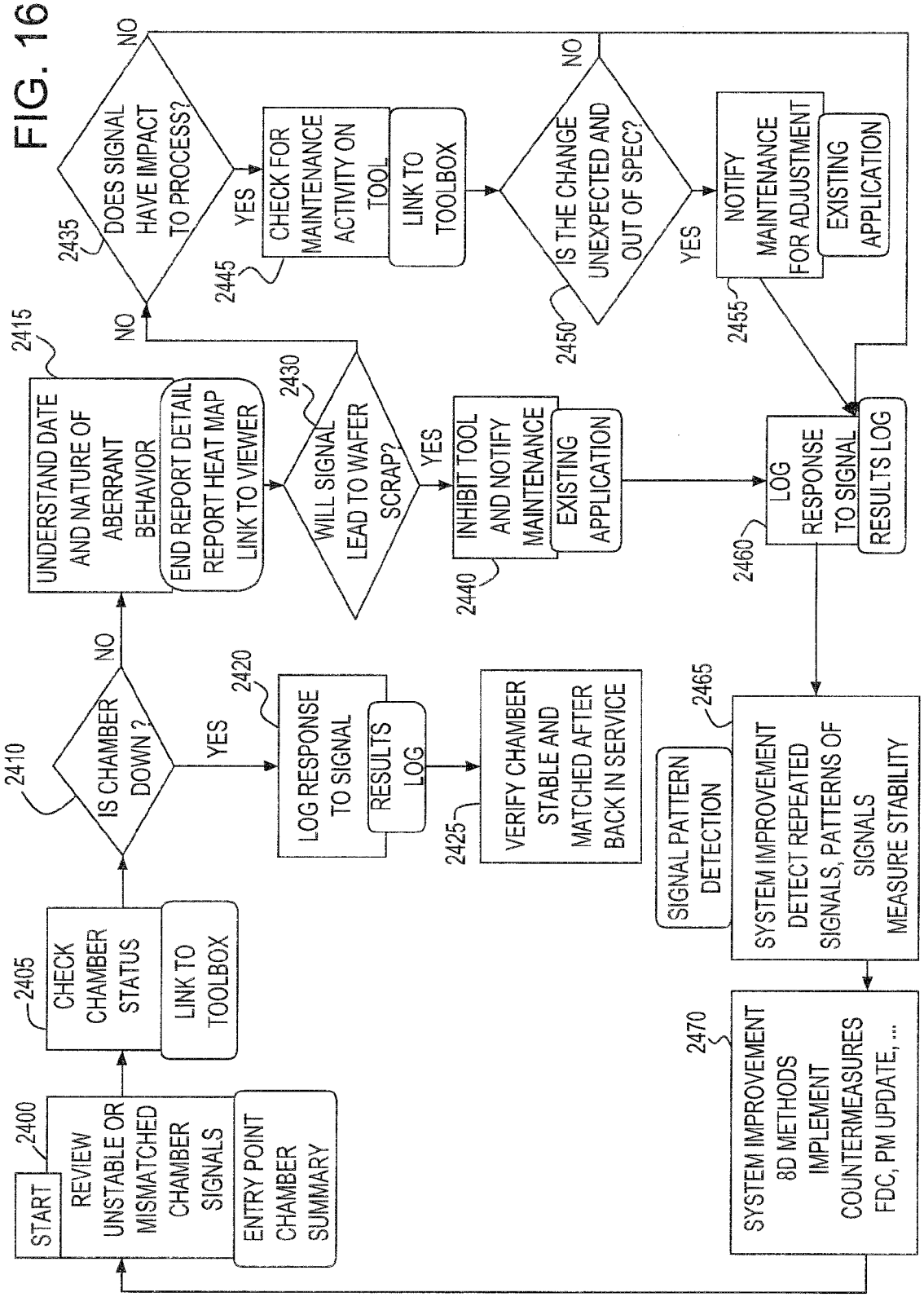
FIG. 16 is a flow chart of actions taken for a tool stability solution according to one embodiment of the present invention.
Figure 17:
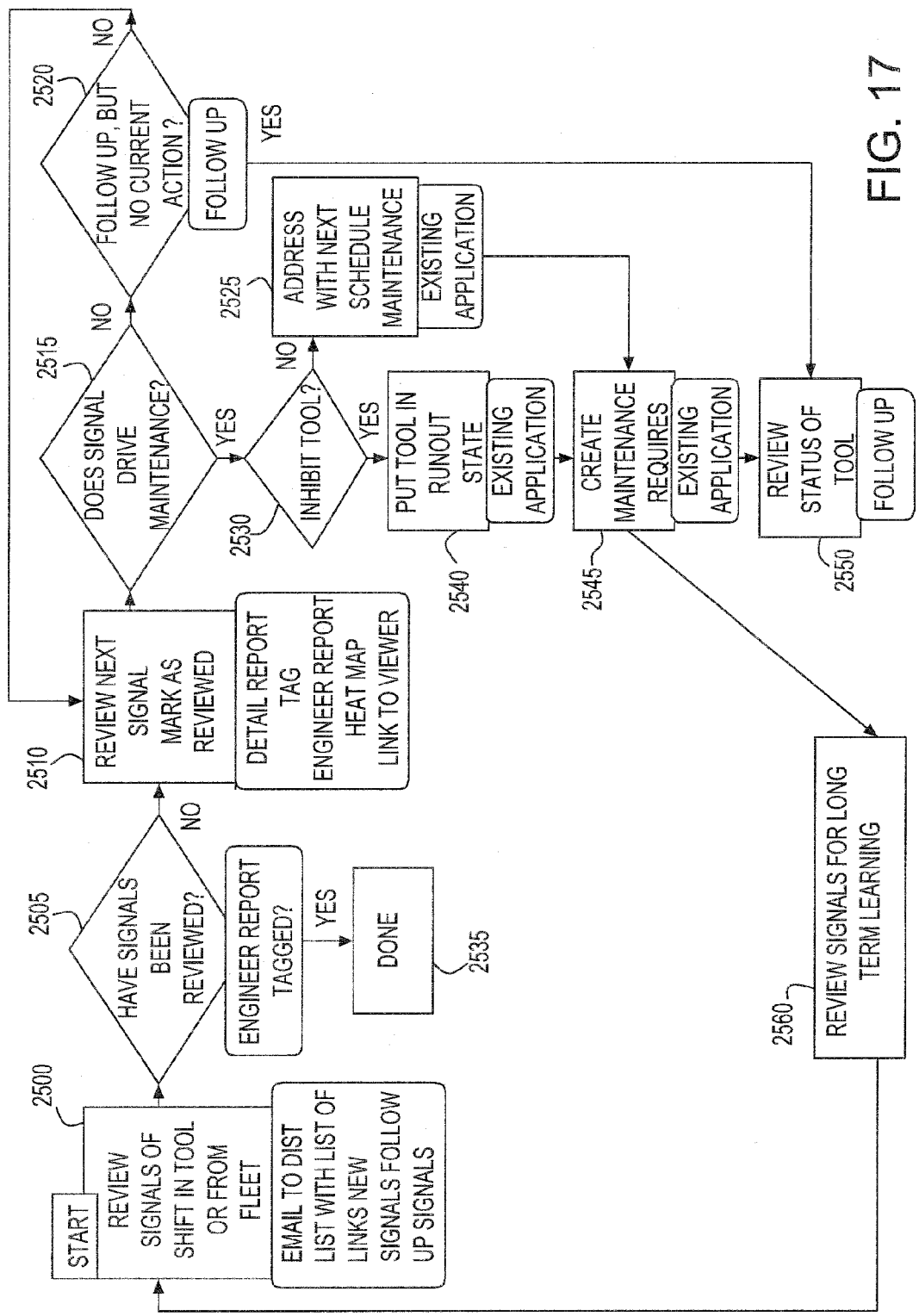
FIG. 17 is another flow chart of actions taken for a tool stability solution according to one embodiment of the present invention.

FIGS. 9, 16 and 17 are flow charts describing actions taken for a Tool Stability/Matching application. Each flow chart is an actual proposed engineer's work flow using the same Tool Stability/Matching application. Each or any flow chart could be used for a Tool Stability or Tool Matching application. These different flow charts illustrate that different engineers could use the Tool Stability/Matching application for somewhat different objectives.

FIG. 16 illustrates a flow chart describing actions taken for a tool stability/matching application. At step 2400, a user identifies an unstable or mismatched chamber in a tool while reviewing a report such as a chamber-recipe report 290. The user may be able to locate the report, e.g., via an entry point (i.e., a component which provides navigations to diverse reports such as chamber-recipe reports and/or engineer's reports). At step 2405, the user evaluates the identified chamber, e.g., via a tool box which provides the user with a description of FDC faults or other descriptors of the status of the chamber or a maintenance activity of the chamber. Information about whether the identified chamber is down is gathered.

At step 2410, based on the gathered information, the user determines whether the identified chamber is operating or not. At step 2420, if the identified chamber does not operate, the user initiates the computing device 1600 to record a log history (i.e., response history) of the identified chamber. At step 2425, the user verifies whether the identified chamber is stable or matched, e.g., by reviewing a chamber-recipe report corresponding to the chamber, after the identified chamber operates again.

If the identified chamber is evaluated as operating at step 2410, the user identifies dates and nature of abnormal behaviour of the chamber at step 2415, e.g., by reviewing an engineer's report summarizing the chamber, a detailed report describing the chamber, a chamber-recipe report illustrating the chamber or by utilizing other applications such as a tool trace viewer (i.e., an application that allows a user to review time series from a sensor at one or multiple recipe steps in the chamber). At step 2430, the user determines whether the abnormal behaviour detected in the tool will lead to degraded or scrapped product. If the user determines that the abnormal behaviour will lead to degraded or scrapped product, at step 2440, the user stops a tool having the chamber, notifies that the tool is temporarily out of service, and contacts a maintenance team to fix the tool. The user may use existing applications such as emails or instant messages for the notifications. After executing the step 2440, the control proceeds to step 2460.

Otherwise, at step 2435, the user evaluates whether the abnormal behaviour of the chamber affects other material product parameters (e.g., a semiconductor yield rate) of the tool having the chamber, e.g., by reviewing historical or reference data or testing semiconductor chips produced from the tool. If the user determines at the step 2435 that the abnormal behaviour of the chamber does not affect the performance of the tool, the control proceeds directly to step 2460. Otherwise, the control branches to step 2445, where the user reviews a maintenance history of the tool, e.g., via the tool box. At step 2450, the user evaluates whether a change in the tool from a previous maintenance activity caused the abnormal behaviour of the chamber, after reviewing the maintenance history. If the user determines the change from the previous maintenance caused the abnormal behaviour of the chamber, at step 2455, the user contacts the maintenance team to adjust the change in the tool, e.g., by sending an email or an instant message. Otherwise, at step 2460, the user initiates the computing device 1600 to record a log history of the chamber and the maintenance team activity.

At the step 2465, the computing device 1600 notifies chronic signals and pattern of abnormal signals, and measures tool stability, e.g., using the above-mentioned statistic tests. At step 2470, the computing device 1600 may implement the 8D method to fix the tool. The computing device 1600 may also implement counter measures and updates FDC systems and the maintenance schedule. The updating FDC systems may initiate an update for a real time control system for the tool. The countermeasures would include, but is not limited to, changing tool operating parameters and changing maintenance procedures. After executing the step 2470, the control returns to step 2400.

FIG. 17 is a flow chart of actions taken for the Tool Stability/Matching application according to one embodiment of the present invention. At step 2500, the computing device 1600 compares previous data from sensors and current data from sensors. Then, the computing device 1600 identifies signals or data that have been changed in a tool or a group of tools. Then, the computing device 1600 sends reports (e.g., chamber-recipe reports) including the changed signals or data to users in a distribution list. The reports may also include new signals or data that newly appeared and previous signals that has been marked as interesting or follow-up signals. The reports may also describe whether a change has been made in a tool to respond to the previous interesting signals or follow-up signals.

At step 2505, after receiving the reports, the user evaluates whether the user has already reviewed the reports or not, e.g., by checking whether reports is tagged with his/her name to indicate that (s)he already reviewed the reports. If a user determined that (s)he already reviewed the reports, the process completes at step 2535. Otherwise, at step 2510, a user who did not yet review the reports can review the changed signals, new signals and previous interesting signals in the reports. When a user completes a review of a report, the user writes his or her name on the report, e.g., by using an html tag, to indicate that (s)he completes the review. While reviewing a report, a user may utilize other applications such as the tool trace viewer.

Upon reviewing the signals in the reports, at step 2515, a user determines whether one of these signals leads to maintenance. If the maintenance is not required, at step 2520, the user evaluates whether the signals needs to be in a future report (e.g., an engineer's report generated in a near future). If the user determines that the signals should be in the future report, the user marks the changed signals and new signals as follow-up signals, e.g., by checking a "follow-up" box (not shown) next to a heat map cell including the signal and the control goes to step 2550. Otherwise, the control returns to the step 2510 in FIG. 17.

If at step 2515 a user determines that the signals in the reports lead to maintenance, the user at step 2530 determines whether accessing or using tools associated with the signals should be prohibited, e.g., based on a severity of the signals; e.g., based on scores corresponding to the signals. If the user determines that the tools can still be used or accessed, at step 2525, the user schedules a maintenance task with a maintenance team, e.g., via emails or instant messages, and the control proceeds to step 2545. Otherwise, at step 2540, the user prohibits accessing or using the tools, e.g., by sending an email or instant message to engineers and technicians responsible for the tools.

At step 2545, the user invokes an application that maintains a list of maintenance activities to be completed on tools to address the signals. Then, at step 2550, the user marks the signals as follow-up signals to appear in a future report. At the same time, at step 2560, the tools are powered down and becomes out of service. Engineers or managers may review the signals for long term learning, and the control goes back to the step 2500.

According to one embodiment of the present invention, in a semiconductor manufacturing environment including a plurality of nominally identical independent tools, a computing device such as the computing device 1600 generates a multi-dimensional array (e.g., a two-dimensional table) of process trace data obtained from sensors in at least one semiconductor manufacturing tool. The at least one semiconductor manufacturing tool may be the nominally identical independent tools.

The multi-dimensional array includes a list of recipe steps in a semiconductor manufacturing recipe in a first dimension and a list of a set of sensors generating measurements (e.g., temperatures or pressures; i.e., the process trace data) from the at least one semiconductor manufacturing tool in a second dimension. The computing device conducts an analysis on at least one preselected subset of the multi-dimensional array in order to evaluate at least one operating characteristic (e.g., abnormality) of the at least one semiconductor manufacturing tool. Alternatively, a user may select a subset of the multi-dimensional array, e.g., via a graphical user interface (not shown). The computing device 1600 may conduct the analysis by performing the above-mentioned statistical test(s) on the process trace data and summarizing (e.g., averaging) results of the statistical test(s). In a further embodiment, the computing device presents the results of the statistical test(s) via a set of hieratically linked and browserable graphics (e.g., a chamber-recipe report 290, engineer's report 430, detailed report 650, manager's report 400).

The multi-dimensional array may further include a specification (i.e., an operation specification) of the at least one semiconductor tools and/or the nominally identical independent tools in another dimension. The multi-dimensional array may further include, but is not limited to, a specification of a time period data for process trace data collection in another dimension and a specification of measurements of product quality or performance. For example, the multi-dimensional array describes that the process trace data is obtained every minute for one month while manufacturing $10^6$ microelectronic devices. The multi-dimensional array may describe measurements of product quality or performance. The computing device 1600 may measure product quality or performance, e.g., based on wafer yield rates.

Figure 18:
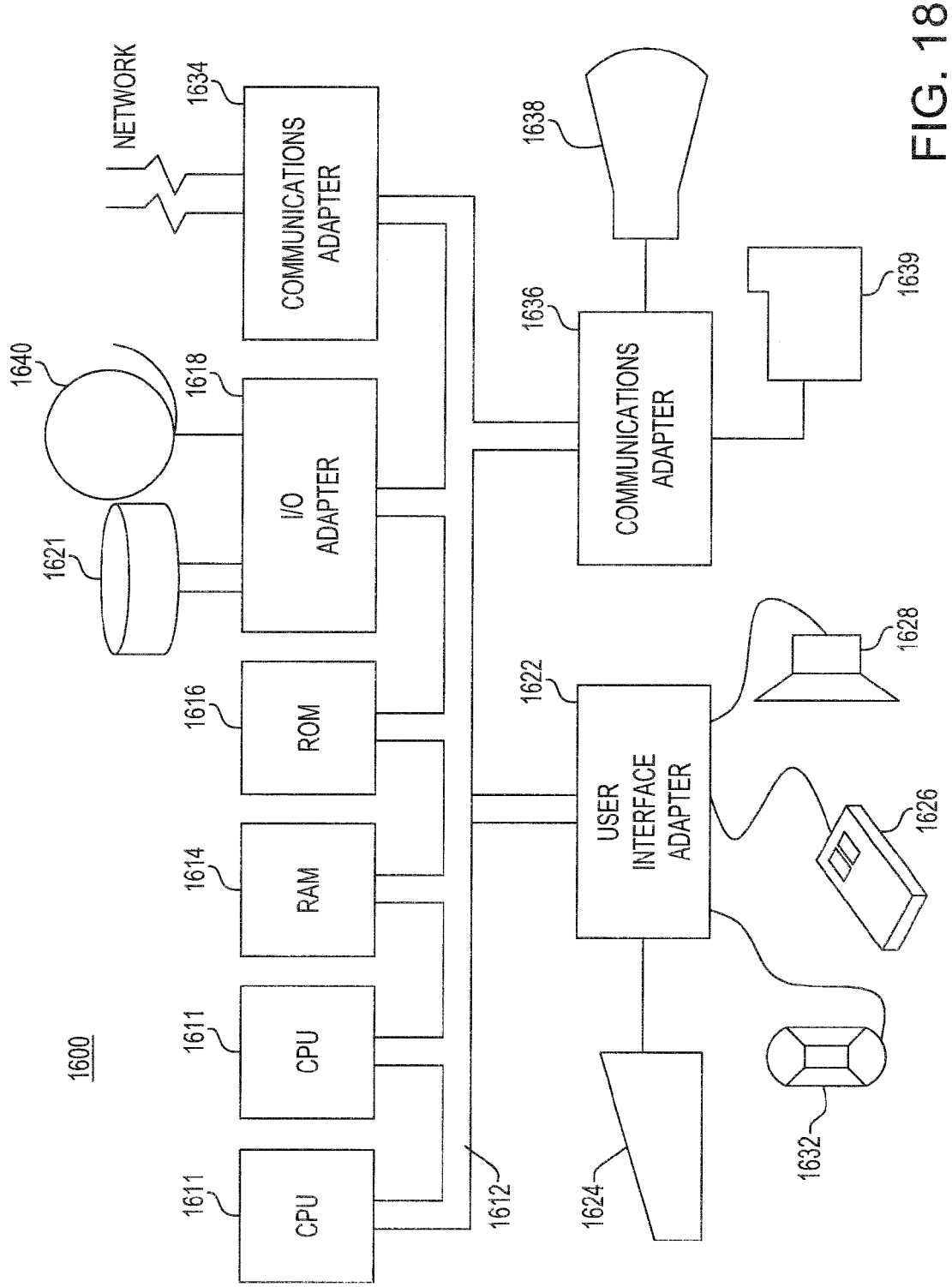
FIG. 18 is an exemplary hardware configuration according to one embodiment of the present invention.

FIG. 18 illustrates a hardware configuration of a computing system 1600 generating the chamber-recipe report, the engineer's report, the manager's report and a detailed report after executing the above-mentioned statistical tests. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

According to one embodiment of the present invention, a score in a heat map reflect how much a corresponding tool behavior (e.g. sensor data) affects a product quality (e.g., yield rate). In other words, the score in the heat map describes a degree of influence that a tool behavior affects a product quality. The computing device 1600 measure how much the tool behavior affects the product quality, e.g., by obtaining the process trace data (e.g., pressures, temperatures, etc.) from sensors in a tool, performing one or more statistical tests (e.g., mutual information, etc.) on the process trace data and product quality measurements and summarizing results of the statistical tests (e.g., designating an average of the results as a score). A higher score may mean that a change in a tool's behavior (e.g. sensor data) is associated with a better quality product. In other words, as a tool has a higher score, the tool operates consistently according to its operation specification and generates a better product.

Figure 19:
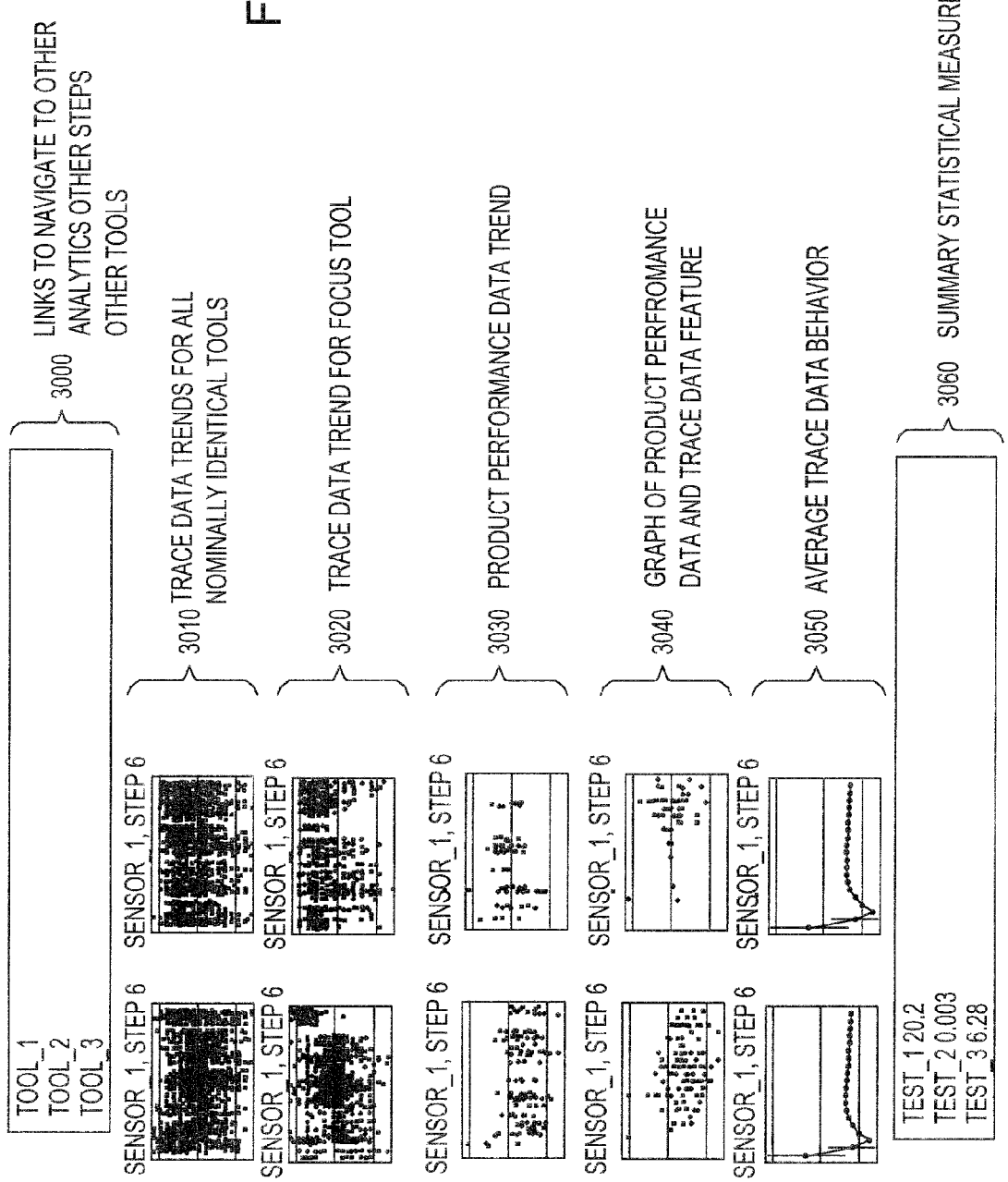
FIG. 19 is a view of an exemplary detailed report under a tool insight solution according to one embodiment of the present invention.

FIG. 19 illustrates an exemplary detailed report for a tool insight solution 110, which measures how a tool behavior influences a product quality or performance, e.g., performing statistical tests on process trace data and product quality measurements. The detailed report illustrates in FIG. 19 includes, but is not limited to: a header 3000 that includes links to navigate to other analyses, other recipe steps or other tools; graphs 3010 represent trace data trends for all nominally identical tools (The left graph may represent trace data trends for a particular period in the past. The right graph may represent trace data trends for a particular period in the present); graphs 3020 represent trace data trends for a particular tool (The left graph may represent trace data trends for a particular period in the past. The right graph may represent trace data trends for a particular period in the present); graphs 3030 represents product performance data trend (The left graph may represent the data trend for a particular period in the past. The right graph may represent the data trend for a particular period in the present); graphs 3040 illustrates product performance versa trace data feature (The left graph may represent product performance versa trace data feature for a particular period in the past. The right graph may represent product performance versa trace data feature for a particular period in the present); graphs 3050 represent average trace data behavior; and a summary 3060 of statistical measures.

Figure 20:
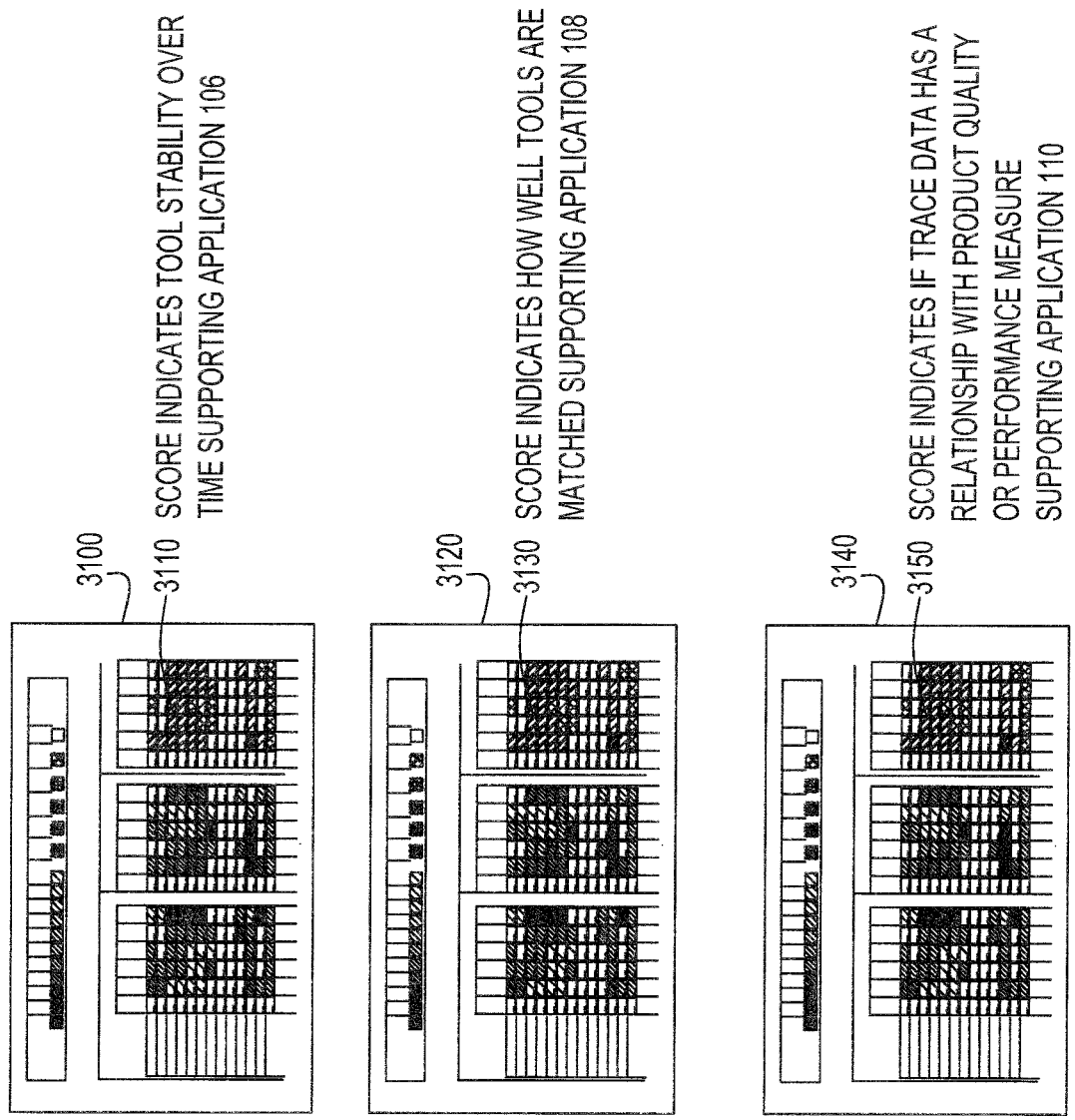
FIG. 20 illustrates that each different chamber-recipe report is independently used for each different application according to one embodiment of the present invention.

FIG. 20 illustrates that each different chamber-recipe report is used for each different application according to one embodiment of the present invention. A chamber-recipe report 3100 is used for a tool stability solution 106. Thus, a score in a cell (e.g., a cell 3110) in the chamber-recipe report 3100 represents how a tool behave stably over a time period. A chamber-recipe report 3120 is used for a tool matching solution 108. Thus, a score in a cell (e.g., a cell 3130) in the chamber-recipe report 3120 represents how well a nominally identical tool is matched with other identical tools. A chamber-recipe report 3140 is used for a tool insight solution 110. Thus, a score in a cell (e.g., a cell 3150) in the chamber-recipe report 3140 represents whether a tool behavior affects a product quality or performance. Each solution may use different or same statistical test(s) to obtain scores. Thus, scores in a chamber-recipe report may be different from or same as scores in other chamber-recipe report. As illustrated in FIG. 19, scores may be color-coded as described above. Each color may represent a score.

FIG. 21 illustrates that each different engineer's report is used for each different solution according to one embodiment of the present invention. An engineer's report 3200 is used for a tool stability solution 106. Thus, a score in a cell (e.g., a cell 3210) indicates how stable a tool over a time period. An engineer's report 3220 is used for a tool matching solution 108. Thus, a score in a cell (e.g., a cell 3230) indicates how well a nominally identical tool is matched with other nominally identical tools. An engineer's report 3240 is used for a tool insight solution 110. Thus, a score in a cell (e.g., a cell 3250) indicates whether a tool behavior affects a product quality or performance. Each solution may use different or same statistical test(s) to obtain scores. Thus, scores in an engineer's report may be different from or same as scores in other engineer's report. As illustrated in FIG. 19, scores may be color-coded as described above. Each color may represent a score.

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions. As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM) or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then complied, interpreted, of otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave, The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. A semiconductor manufacturing tool may also include a computing device such as the computing device 1600 in FIG. 18. In the latter scenario, the remote computer may be connected to the user's computer through any type of network, including a local area network (LAN) or a wide area network (WAN), or the connection may be made to an external computer (for example, though the Internet using an Internet Service Provider).

The present invention is described above with reference to flow chart illustrations and/or block diagrams of methods, apparatus (systems) and computer program products according to embodiments of the invention. It will be understood that each block of the flow chart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions means which implement the function/act specified in the flowchart and/or block diagram block of blocks.

The computer program instruction may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A method suitable for use in a manufacturing environment comprising a multiplicity of nominally identical independent tools, the method comprising the steps of:
configuring a computing device including a processor and a memory to generate a multi dimensional array of process trace data derived from at least one of the independent tools, wherein, said array including data representing a first dimension comprising a list of steps in a manufacturing recipe and data representing a second dimension comprising a list of a set of sensors generating measurements from at least one of the independent tools;
configuring said computing device including said processor and said memory to conduct an analysis on at least one preselected subset of said multi dimensional array for the purpose of evaluating at least one operating characteristic of at least one of the independent tools; and
configuring said computing device including said processor and said memory to present results of the analysis via a set of hierarchically linked and browseable graphics.

2. The method according to claim 1, wherein said multidimensional array further comprises data representing a third dimension comprising a specification of a set of nominally identical tools.

3. The method according to claim 1, wherein said multidimensional array further comprises data representing a third dimension comprising a specification of a time period data for process trace data collection.

4. The method according to claim 1, wherein said analysis comprises a step of conducting at least one statistical test on the process trace data.

5. The method according to claim 1, wherein said multidimensional array further comprises data representing a third dimension comprising a specification of measurements of a product quality or performance.

6. The method according to claim 5, wherein said analysis comprises a step of summarizing the results of multiple individual statistical tests.

7. The method according to claim 6, wherein the summarizing includes a step of averaging the results of the multiple individual statistical tests.

8. The method according to claim 1, further comprising:
selecting, by a user, a subset of the multidimensional array via a graphical user interface.

9. A system suitable for use in a manufacturing environment comprising a multiplicity of nominally identical independent tools, the system comprising:
at least one memory device;
at least one processor coupled to the at least one memory device,
wherein the at least one processor is configured to:
generate a multi dimensional array of process trace data derived from at least one of the independent tools, wherein, said array including data representing a first dimension comprising a list of steps in a manufacturing recipe and data representing a second dimension comprising a list of a set of sensors generating measurements from at least one of the independent tools;
conduct an analysis on at least one preselected subset of said multi dimensional array for the purpose of evaluating at least one operating characteristic of at least one of the independent tools; and
present results of the analysis via a set of hierarchically linked and browseable graphics.

10. The system according to claim 9, wherein said multidimensional array further comprises data representing a third dimension comprising a specification of a set of nominally identical tools.

11. The system according to claim 9, wherein said multidimensional array further comprises data representing a third dimension comprising a specification of a time period data for process trace data collection.

12. The system according to claim 9, wherein said analysis comprises a step of conducting at least one statistical test on the process trace data.

13. The system according to claim 9, wherein said multidimensional array further comprises data representing a third dimension comprising a specification of measurements of a product quality or performance.

14. The system according to claim 13, wherein said analysis comprises a step of summarizing the results of multiple individual statistical tests.

15. The system according to claim 14, wherein the summarizing includes a step of averaging the results of the multiple individual statistical tests.

16. The system according to claim 9, wherein the at least one processor is further configured to:
enable a user to select a subset of the multidimensional array via a graphical user interface.

17. A non-transitory computer readable medium embodying computer program instructions being executed by a processor for causing a computer to perform method steps for use in a manufacturing environment comprising a multiplicity of nominally identical independent tools, said method steps comprising the steps of claim 1.

18. The method according to claim 1, wherein the multi dimensional array represents a behavior of said multiplicity of nominally identical independent tools, and a user uses the multi dimensional array to detect an abnormal behavior of said multiplicity of nominally identical independent tools.

19. The method according to claim 1, further comprising:
reviewing, by a user, the multi dimensional array;
determining whether an immediate action is needed on said multiplicity of nominally identical independent tools in response to the reviewing;
stopping one or more of said multiplicity of nominally identical independent tools and notifying a maintenance team in response to determining that said immediate action is needed; and
reviewing faults and maintenance history of said multiplicity of nominally identical independent tools in response to determining that said immediate action is not needed.

20. The method according to claim 1, further comprising:
automatically detecting a chronic fault signal occurrence, associated with said multiplicity of nominally identical independent tools, from said multi dimensional array; and
automatically notifying a presence of said chronic fault signal occurrence to a user.

21. The method according to claim 19, further comprising:
measuring a stability of said multiplicity of nominally identical independent tools or a stability of a component in said multiplicity of nominally identical independent tools.

22. The method according to claim 21, wherein said measuring said stability of said multiplicity of nominally identical independent tools or a stability of a component in said multiplicity of nominally identical independent tools comprises steps of:

identifying, by said user, an unstable or mismatched machine tool while reviewing said multi dimensional array;

reviewing, by said user, a maintenance history associated with said unstable or mismatched machine tool;

determining, by said user, whether said unstable or mismatched machine tool is currently operating;

identifying, by said user, an abnormal behavior of said unstable or mismatched machine tool, based on said reviewing said multi dimensional array, in response to determining that said unstable or mismatched machine tool is currently operating;

determining, by said user, whether said abnormal behavior is a cause of a degraded product;

stopping, by said user, said operation of said unstable or mismatched machine tool in response to determining that said abnormal behavior is said cause of said degraded product; and determining, by said user, whether said abnormal behavior is caused by a prior maintenance, based on said reviewed maintenance history associated with said unstable or mismatched machine tool.

23. The method according to claim 22, further comprising:

notifying, by said user, a corresponding maintenance team to adjust a change made by said prior maintenance in response determining that said abnormal behavior is caused by said prior maintenance; and automatically recording a log history associated with said unstable or mismatched machine tool in response to determining that said abnormal behavior is not said cause of said degraded product or in response determining that said abnormal behavior is caused by said prior maintenance.

24. The method according to claim 21, wherein said measuring comprises steps of:

automatically comparing previous data from said at least one sensor against current data from said at least one sensor;

automatically identifying a signal or data that has been changed between said previous data and said current data;

automatically sending a report including said identified signal or data to said user;

reviewing, by said user, said sent report; and determining, by said user, whether said identified signal or data requires a maintenance to said associated machine tool.

25. The method according to claim 24, further comprising:

indicating, by said user, said indentified signal or data to be included in a report.

* * * * *